United States Patent
Ballato et al.

(10) Patent No.: US 12,313,813 B2
(45) Date of Patent: May 27, 2025

(54) MOLTEN CORE FLUX FORMATION METHOD AND FIBERS FORMED THEREFROM

(71) Applicants: CLEMSON UNIVERSITY, Clemson, SC (US); Ursula Gibson, Hanover, NH (US)

(72) Inventors: John Ballato, Clemson, SC (US); Thomasina Zaengle, Clemson, SC (US); Baris Kukuoz, Anderson, SC (US); Ursula Gibson, Hanover, NH (US)

(73) Assignee: Clemson University Research Foundation, Clemson, SC (US)

( * ) Notice: Subject to any disclaimer, the term of this patent is extended or adjusted under 35 U.S.C. 154(b) by 314 days.

(21) Appl. No.: 18/078,156

(22) Filed: Dec. 9, 2022

(65) Prior Publication Data
US 2023/0184997 A1  Jun. 15, 2023

Related U.S. Application Data

(60) Provisional application No. 63/288,925, filed on Dec. 13, 2021.

(51) Int. Cl.
G02B 1/02   (2006.01)
C03C 27/00  (2006.01)
G02B 6/02   (2006.01)

(52) U.S. Cl.
CPC ............... *G02B 1/02* (2013.01); *C03C 27/00* (2013.01); *G02B 6/02* (2013.01)

(58) Field of Classification Search
CPC .. G02B 1/02; G02B 6/02; C03C 27/00; C03C 14/006
See application file for complete search history.

(56) References Cited

U.S. PATENT DOCUMENTS 9,632,245 B2 * 4/2017 Wang ................... G02B 6/0288

* cited by examiner

*Primary Examiner* — John Bedtelyon
(74) *Attorney, Agent, or Firm* — DORITY & MANNING, P.A.

(57) ABSTRACT

Disclosed are methods for formation of a fiber and fibers that can be formed according to the methods. Formation methods incorporate a "molten core flux method" whereby a solid primary core material is combined with a solid secondary flux material in a multi-phase preform core. In some embodiments, the multi-phase preform core has a liquidus temperature that is reduced relative to the melting temperature of at least the primary core material. A homogeneous liquid melt of the preform core can exhibit a sufficiently low vapor pressure such that a fiber preform incorporating the materials in the core can be thermally drawn. Upon cooling and solidification of the homogeneous core melt, separation of the core components can occur via recrystallization, with one phase being that of the desired primary core material. Methods can be particularly beneficial for forming fibers incorporating high vapor pressure semiconductor materials, e.g., ZnSe or GaAs, in the fiber core.

20 Claims, 24 Drawing Sheets a) As-drawn GaAsSb core glass-clad fiber b) After laser annealing at a slow scan speed (0.16 mm/s)

c) After laser-driven phase segregation

MOLTEN CORE FLUX FORMATION METHOD AND FIBERS FORMED THEREFROM

PRIORITY CLAIM

The present application claims the benefit of priority of U.S. Provisional Patent Application No. 63/288,925, titled Molten Core Flux Formation Method and Fibers Formed Therefrom, filed Dec. 13, 2021, which is incorporated herein by reference for all purposes.

STATEMENT REGARDING FEDERALLY SPONSORED RESEARCH OR DEVELOPMENT

This invention was made with government support under Grant No. 1808232, awarded by the National Science Foundation. The government has certain rights in the invention.

BACKGROUND

Semiconductors enable all modern electronic devices while optical fibers have enabled the control, confinement, and guiding of light around the world. The field of optoelectronics represents the interface between optics and electronics to seamlessly integrate the functions of both fields into devices and applications. Semiconductor optical fibers combine the functionality of semiconductor-based optoelectronics with the manufacturing scalability and light-guiding capability of optical fibers to provide so-called "in-fiber" optoelectronics. These materials show promise in a myriad of applications such as nonlinear fiber optic communication devices, wearable optoelectronic sensors, and infrared fiber light sources and detectors, as well as non-optical applications such as thermo-electrics.

Primary technologies employed for the fabrication of semiconductor optical fibers include the high-pressure chemical vapor deposition method (HP-CVD) and the molten core method (MCM). HP-CVD employs gas-phase reactions at high pressures to deposit the semiconductor phase inside a silica glass capillary. MCM employs a bulk preform comprising a glass cladding tube and a solid phase preform core. At the temperature at which the cladding glass softens and can be drawn into a fiber, the preform core is molten and transitions during the draw from bulk preform into the desired fiber core. As the drawn fiber cools, the molten core solidifies. Thermal post-processing of the fiber, often using a laser in a thermal gradient treatment protocol, can be used to further enhance the properties of the core phase or, in some cases, modify the ratio or spatial relationship of the compositional components.

Due to scalability and cost issues, most semiconductor optical fibers are made using the MCM approach. Unfortunately, however, this process has been limited to core materials that have only low volatility at the fiber draw temperature because a high vapor pressure core material can cause the fiber to deform or even explode during formation. As a result, efforts to realize fibers of such materials have been limited to HP-CVD or low-temperature solid-state reactions which have seen limited use due to scale-up limitations and high costs, and thereby, a lack of industrial acceptance.

What are needed in the art are cost-effective methods for forming fibers that include cores of materials with nominally high volatility at their melting points. Methods that can be utilized for forming fibers including cores of high vapor pressure semiconductor materials would be of great benefit in the art and provide a route to formation of semiconductor optoelectronic fibers that include core semiconductor materials that have not previously been available in a fiber form or were very limited in length and, therefore, utility.

SUMMARY

According to one embodiment, disclosed is a method for forming a fiber that includes a core and a clad. A method can include combining a first solid phase with a second solid phase to form a multi-phase preform core, the first solid phase comprising a primary core material and the second solid phase comprising a flux material. It should be understood that in the present context "primary" core material is intended to refer to the technologically desired phase so as to not confuse "primary" with "dominant" in terms of concentration. In other words, we may use 70% Sn/30% GaAs but GaAs is the "primary" phase since that's what we want. The tin is the secondary phase, the flux, even if its concentration is greater. A method can also include drawing a preform that includes the multi-phase preform core within a preform clad. The preform can be drawn at conditions that includes a drawing temperature that is lower than the melting temperature of the primary core material and that is at or higher than the melting temperature of the multi-phase preform core. At the drawing temperature, the preform core becomes a homogeneous melt. The method also includes cooling the drawn fiber. Upon the cooling, the homogeneous melt phase separates and solidifies to form a fiber core that includes a first solid phase that includes the crystalline primary core material and another solid phase that includes the flux material and/or a reaction product of the flux material. In some embodiments, a formation method can include post-formation treatment of the fiber, e.g., thermal treatment that can further modify the core, e.g., separate or modify solid phases within the fiber core.

According to one embodiment, disclosed is a melt drawn fiber that includes a primary core material and a flux material or a reaction product of a flux material as separate solid phases within the core of the fiber. In some embodiments, the primary core material can be crystalline, e.g., a crystalline arsenide, selenide, sulfide, telluride, phosphide, oxide, or a mixture thereof. In some embodiment, a primary core material can include a semiconductor material, e.g., a semiconductor material that exhibits a high vapor pressure at temperatures approaching its melting point. Exemplary primary core materials can include gallium arsenide (GaAs) or zinc selenide (ZnSe). A melt drawn fiber can be recognized by such by the form or structure of the fiber, e.g., a lack of striations as are present in CVD-formed fibers, including a fiber core that is solid across the entire cross-section of the fiber, or being quite long, e.g., about 1 meter or more in length at formation and prior to post-processing during which the formed fiber can be cut to shorter lengths.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
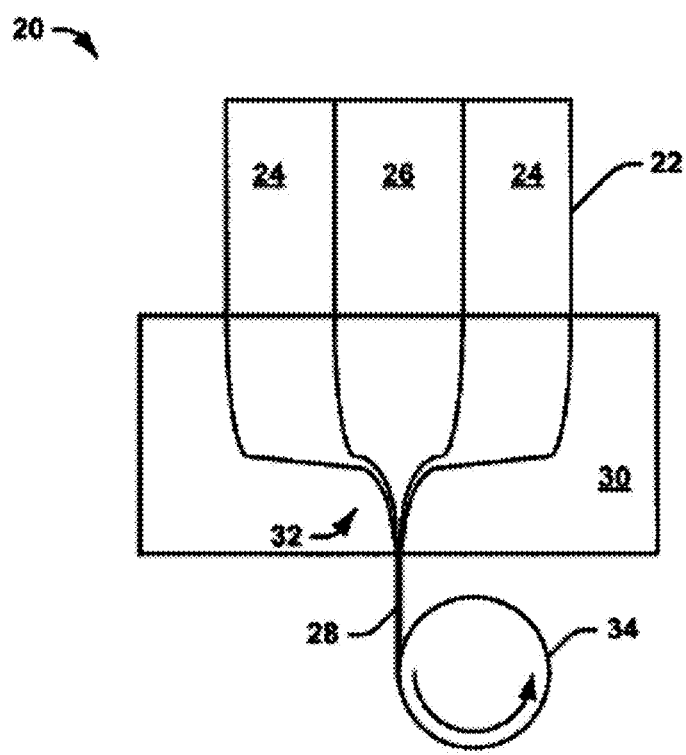
FIG. 1 schematically illustrates one method for forming a fiber as described herein.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, disclosed herein are methods for formation of a fiber and fibers that can be formed according to the methods. Disclosed methods can be particularly beneficial in forming fibers that include a crystalline core component that exhibits a high intrinsic volatility at desired draw conditions, e.g., industrially useful draw temperatures and ambient (atmospheric) pressure.

As utilized herein, the term "crystalline" generally refers to polycrystalline as well as single crystal materials. Accordingly, use of the term "crystalline" is not intended to exclude either polycrystalline materials or single crystal materials unless specifically described as such. In addition, the term "single crystal" generally refers to a crystalline material that does not include grain boundaries within a specified length or volume of the material. For example, a single crystal core can include substantially no grain boundaries within a length of the fiber that is referred to as a "single crystal core."

While disclosed methods can be utilized in forming many types of fibers, the methods can be particularly beneficial in forming, in particular embodiments, optical fibers containing semiconductor phases, such as GaAs and ZnSe, that exhibit volatilities that generally preclude direct liquid phase processing under ambient conditions and therefore, previously could not be efficiently incorporated into thermally drawn fibers. Beneficially, disclosed methods can provide optoelectronically desirable semiconductor phases in fibers using scalable and industry-accepted draw methods.

Formation methods described herein incorporate a "molten core flux method" whereby a secondary solid phase (herein referred to as a flux material) is combined with a desired primary core material (e.g., a semiconductor material) in a preform core that is surrounded by a drawable glass cladding tube. When combined and heated above a liquidus temperature for the core mixture, the primary core material and the secondary flux material form a homogeneous melt solution. The liquidus temperature for the mixture is reduced relative to the melting temperature of at least the primary core material and, in some embodiments, is reduced relative to the melting temperatures of multiple or all of the pure compositions of the preform core (e.g., primary core material(s), flux material(s), dopant(s), etc.). Moreover, the homogeneous liquid melt can exhibit a sufficiently low vapor pressure such that a glass-clad fiber preform incorporating the materials in the core can be thermally drawn. Upon cooling and solidification, crystallization of the core components can occur within the fiber and the core can include one phase of the desired primary core material. Other phases in the cooled drawn fiber can include the flux material and/or reaction products of the flux material formed during the draw. Optionally, phases of the drawn fiber can be separated from one another by post-processing with, for example, a laser in a thermal gradient treatment.

Primary core components included in a fiber core preform (and the fiber core formed therefrom) can include one or more materials that can provide a desirable characteristic to the formed fiber. By way of example and without limitation, primary crystalline core materials can include one or more arsenides, selenides, sulfides, phosphides, oxides, tellurides, or combinations thereof that have electrical, optical, optoelectronic, and/or thermoelectric properties of interest.

While primary core components can encompass any desired fiber core materials, in one embodiment, primary core components can include one or more high vapor pressure materials, and in one particular embodiment, high vapor pressure semiconductor materials. As utilized herein, a high vapor pressure material can generally refer to a material that exhibits a vapor pressure of about 30 kPa or greater at the melting temperature of the material at ambient pressure, for instance, about 40 kPa or greater, or about 50 kPa or greater, in some embodiments. For instance, GaAs and ZnSe are generally considered to be high vapor pressure semiconductor materials when heated proximate to their melting points that can be incorporated in a fiber formed according to disclosed methods; GaAs has been reported to exhibit a vapor pressure at melting temperature and ambient pressure of from about 70 kPa and about 75 kPa and ZnSe has been reported to exhibit a vapor pressure at melting temperature and ambient pressure of from about 55 kPa to about 100 kPa.

In one particular embodiment, a fiber core can incorporate one or more semiconductor materials. High-performance optoelectronic devices are almost exclusively fabricated from crystalline compound semiconductors owing to their superior light emission efficiency, excellent electronic properties (e.g., high carrier mobility), and large optical nonlinearities. In some embodiments, a compound semiconductor material of a fiber core can have high second-order nonlinear optical coefficients, $\chi^{(2)}$, not found in cubic or, more generally, centrosymmetric crystalline semiconductors (e.g., Si, Ge, SiGe) or in amorphous semiconductors. Second-order nonlinearities of a core material can allow for efficient frequency conversion on which devices such as optical parametric oscillators are typically based. Crystalline compound semiconductors can also be of benefit in disclosed fibers due to their ability to host transition metal ions as dopants (example of which are provided further herein). For instance, $Cr^{2+}$-doped ZnSe can function as an efficient gain medium in the 2000 to 3000 nm region of the infrared spectrum, while in one embodiment, $Fe^{2+}$-doped ZnSe can prove beneficial as a medium for longer wavelength applications (e.g., about 4000 nm to about 5000 nm).

In one embodiment, a fiber core can incorporate a semiconductor material that includes Group IV elements or compounds. For example, silicon (Si), germanium (Ge), or a combination thereof, e.g., SiGe, can be incorporated into a fiber core. Examples of semiconductor compounds that can be utilized as a core material can include Group III-V compounds, such as GaAs or indium phosphide (InP) as well as Group II-VI compounds including, without limitation, cadmium sulfide (CdS), cadmium selenide (CdSe), zinc sulfide (ZnS), zinc selenide (ZnSe), zinc telluride (ZnTe), or combinations thereof. Other examples of semiconductor materials as may be incorporated within a core of a fiber as disclosed can include, without limitation, lead sulfide (PbS), lead selenide (PbSe), lead telluride (PbTe), indium selenide ($In_2Se_3$), indium (II) selenide (InSe), copper indium selenium (CuInSe$_2$), bismuth selenide ($Bi_2Se_3$), indium arsenide (InAs), indium gallium arsenide (InGaAs), silicon germanium ($Si_xGe_{1-x}$), as well as any combination of such materials.

In one embodiment, a chalcogenide material can be incorporated into a fiber core, for instance, a crystalline chalcogenide that is a semiconductor material or another chalcogenide of interest. As utilized herein, the term chalcogenide refers to a chemical compound comprising at least one chalcogen anion (e.g., sulfur, selenium, or tellurium) and at least one electropositive element, such as a metal, transition metal, or metalloid. Examples of crystalline chalcogenides that may be incorporated in a fiber as described can include, without limitation, zinc sulfide (ZnS), zinc selenide (ZnSe), zinc telluride (ZnTe), cadmium sulfide (CdS), cadmium selenide (CdSe), cadmium telluride (CdTe), mercury sulfide (HgS), mercury selenium (HgSe), mercury telluride (HgTe), and alloys thereof, e.g., Cd(Se, Te), Zn(Se,Te).

Other materials that can be incorporated in a fiber core can include oxides of interest, e.g., zinc oxide (ZnO) and phosphides, such as indium phosphide (InP), gallium phosphide (GaP), aluminum phosphide (AlP), and combinations thereof, e.g., InGaP.

In some embodiments, a fiber may incorporate GaAs in the core. GaAs may be of particular interest as it is well established for uses in LEDs, solar cells, and high power/high speed electronics and on-chip optoelectronics. The ability to form a fiber incorporating GaAs in the core, as well as the fibers formed thereby, may thus provide particularly beneficial improvements to the art.

In some embodiments, a fiber may incorporate ZnSe in the core. ZnSe is a semiconductor that also exhibits optical transparency over a wide wavelength range, e.g., from about 500 nm to about 22,000 nm, which can be of great benefit in an optoelectronic fiber format. Such materials can provide a low-optical-loss crystalline, direct-bandgap compound semiconductor fiber and infrared fiber amplifiers and lasers.

A fiber as described can also include one or more dopants as are known in the art, such as selected Group III and IV elements, rare earth elements (e.g., lanthanides), transition metals, etc. For instance, one or more n-dopants (e.g., phosphorous, antimony, arsenic, bismuth), p-dopants (e.g., boron, gallium), or light emitting dopants (e.g., chromium, iron, etc.) can be included in a core, and in particular, in a primary core component of a core.

Examples of transition metal dopants as may be incorporated in a core can include one or more transition metals of groups 4, 5, 6, 7, 8, 9, 10, 11, or 12 of the periodic table of the elements. In one embodiment, a transition metal dopant can have an oxidation state of 0, +1, +2, +3, +4, or mixtures thereof. By way of example, a core can include as dopant a transition metal including vanadium, chromium, manganese, iron, cobalt, niobium, molybdenum, ruthenium, and rhodium, or a combination thereof, e.g., chromium (II) and/or iron, which are light emissive dopants as may be utilized in some embodiments.

When included, the concentration of a dopant is not particularly limited. For instance, in one embodiment, a fiber core can include a dopant concentration in an amount form about $10^{12}$ cm$^{-3}$ to about $10^{23}$ cm$^{-3}$, for instance, from about $10^{13}$ cm$^{-3}$ to about $10^{23}$ cm$^{-3}$, for instance, from about $10^{15}$ cm$^{-3}$ to about $10^{20}$ cm$^{-3}$ in some embodiments.

In conjunction with the primary core material, a core preform can include a flux material. A flux material can encompass any material that, when combined with the primary core material, can serve to effectively lower the melting temperature of the primary core material, as the liquidus temperature at the draw condition for a mixture of the primary core material and the flux material is lower than that of the primary core material alone. The resultant melt is homogeneous and can be of low vapor pressure sufficient for fiber drawing in a glass cladding.

Flux materials can include elemental materials as well as compounds and alloys as well as mixtures of multiple flux materials. For instance, in some embodiments, a flux material can include one or more metals including, without limitation, tin (Sn), gold (Au), copper (Cu), gallium (Ga), antimony (Sb), silicon (Si), germanium (Ge), bismuth (Bi), silver (Ag), cadmium (Cd), lead (Pb), indium (In), selenium (Se), manganese (Mn), nickel (Ni), in elemental or compound form. Examples of compound flux materials can include, without limitation, SiGe, GaSb, $PbCl_2$, InAs, InSb, $In_2Se_3$, SnSe, MnSe, and $Cu_8GeSe_6$.

The amount of the flux material incorporated in the preform core is not particularly limited. Ideally, the amount of the flux material will be as low as necessary to achieve the desired draw condition so as to maximize the core content of the primary core material. However, this is not a requirement and the amount of flux material in the preform core can vary from about 10 at. % to about 95 at. % of the preform core, such as from about 25 at. % to about 90 at. %, such as from about 35 at. % to about 85 at. % in some embodiments.

A fiber can be formed to include a cladding of any suitable cladding glass. Typical cladding glasses can include, without limitation, silica ($SiO_2$), silicates, borosilicates, phosphates, chalcogenides, germanates, etc. as are known in the art. Morris S, Hawkins T, Foy P, Ballato J, Martin S W, Rice R. Cladding glass development for semiconductor core optical fibers. *International Journal of Applied Glass Science*. 2012 June; 3(2):144-153. In one embodiment, a clad can include one or more oxide glasses, such as silicate glasses, phosphate glasses, germanate glasses, etc. In one embodiment, a cladding can be formed of a pure oxide glass, e.g., pure silica. In another embodiment, a cladding can include a high proportion of an oxide glass. For instance, the clad can include a silicate with a silica concentration of greater than about 90 mol %, or greater than about 95 mol %.

The clad can be doped with any of a variety of dopants as are known in the art to achieve a desired characteristic, e.g., refractive index, thermal expansion coefficient, and/or draw temperature such that it draws into fiber at a temperature above the liquidus temperature of the preform core mixture.

To form a fiber, the core components (including one or more primary core materials and one or more flux materials) can be combined and loaded into a preform tube of the cladding material prior to drawing the preform at the desired draw conditions to form the fiber according to a molten core method approach. Beneficially, disclosed formation methods can incorporate in the preform core the primary core components in their final form as desired in the drawn fiber. This differs from many previously described fiber formation approaches which incorporate precursor components in the preform with the precursors designed to react with one another during the drawing process to form desired core materials of the drawn fiber. In the disclosed formation techniques, the primary core materials, e.g., a high vapor pressure semiconductor or the like, is incorporated in the preform core with no need to form the primary core material during a reaction in conjunction with the draw. This can greatly improve control of fiber core content in the final product.

In one embodiment, the core preform can be formed by compacting powders of one or more primary core materials and one or more flux materials to form a solid rod that includes the various materials as separate solid phases within the preform. This may serve to limit the amount of air removal during fiber formation. In another embodiment, however, it may be preferred to provide the core preform in the form of a powder or particle mixture, with no compacting prior to loading the core materials in the cladding component.

A preform can be formed by forming or providing the clad component with the desired geometry. In some embodiments, a preform clad can be substantially cylindrical. However, it is to be understood that a preform clad can have any of a variety of cross-sectional shapes, including, without limitation, rectangular, elliptical, or "D"-shaped. As an example, clad preform can be formed by core-drilling a hole in a solid rod of a cladding material, such as substantially at a center axis or cross-sectional centroid of the solid rod to form a tubular shape having open ends. As described herein, the term "core-drilling" is intended to refer to the use of a core-drill or alternatively, can refer to boring, pressing, fusing, and/or stamping a boule to generate the clad preform.

The preform core can be in any suitable starting arrangement, such as a boule, window, slug, a plurality of chips, a powder, and so forth, that includes at least a first solid phase of a primary core material and a second solid phase of a flux material. For example, a core preform can include a compacted powder shaped in the form of a boule or the core preform can be core-drilled from a larger piece of the solid mixture. As with the preform clad, the external shape of the preform core is not limited to any particular cross-sectional shape, and the preform core can have any of a variety of shapes, such as substantially cylindrical, elongated D-shape, or spherical. In some embodiments, the cross-sectional shape of the preform core can be the same (or substantially the same) as the core of the final formed fiber. In other embodiments, the two can differ, and the core of the fiber can take on the desired final shape during the draw and subsequent cooling.

To form the preform, the preform core can be inserted or "sleeved" in a hole of the preform clad. It will be understood that the preform core need not be centered within the clad preform. For instance, the core can be offset from the center of the preform and hence of the final fiber, or it can follow a helical trajectory along the length of the fiber if spun during drawing.

In those embodiments in which the preform core mixture is not previously shaped into a solid or semi-solid material, for instance when the preform core mixture is in the form of a mixture of powders or a plurality of chips, the mixture can be located within the preform clad as that mixture. Thus, a preform can be generated in any of a variety of ways.

Following formation of the preform, the resultant preform can be thermally drawn into a fiber, such as via a fiber drawing tower, at the desired draw conditions.

FIG. 1 illustrates one system 20 as may be utilized for forming a fiber 28 from a preform 22. The system 20 includes a hot zone 30, such as can be included in a fiber drawing tower furnace. The hot zone 30 can be set at a draw temperature to apply heat that is sufficient to soften the material of the clad preform 24 and to melt the solid phase mixture of the core preform 26. Specifically, the hot zone 30 can be set to a draw temperature at which the clad component 24 is sufficiently soft so as to draw as desired and at which the multiphase solid mixture of the preform clad 24 is above its liquidus temperature. The particular draw temperature of the system can vary depending upon the cladding glass composition and the particular primary and flux materials included in the preform core. The draw temperature can be below the melt temperature of the primary core material (s). In some embodiments, the draw temperature can also be lower than the melt temperature of the flux material(s). In any case, the combination of the primary core materials with the flux materials serves to lower the melt temperature of the solid phase mixture and allow the fiber to be drawn at a temperature lower than that of the melt temperature primary core material(s) at the draw conditions, thus mitigating previous limitations of the molten core method for fiberizing volatile core compounds.

The draw temperature at which the core preform 26 is a homogeneous melt and the clad preform 24 is at a viscosity to provide an acceptable draw can be only slightly above the melting temperature of the core preform. For instance, the draw temperature can be from about 10° C. to about 200° C. above the liquidus temperature of the solid phase mixture of the core. By way of example, in some embodiments, a draw temperature can be from about 900° C. to about 1200° C., such as from about 950° C. to about 1150° C. or from about 1000° C. to about 1100° C.

In general, a draw can be carried out under ambient pressure (i.e., atmospheric). This is not a requirement, however, and a draw can alternatively be carried out under vacuum (e.g., complete or partial vacuum), at increased pressure, or with an over-pressure of the volatile core compound species. Moreover, in some embodiments, a draw can be carried out in a reducing atmosphere or most commonly under an inert atmosphere, e.g., at ambient pressure.

As illustrated in FIG. 1, a preform 22 can be thermally drawn from a first end 32 to form the fiber 28. During the draw process, the softened cladding material can act as a crucible to confine the molten core materials as it is drawn into the fiber 28.

The resultant fiber 28 can then cool, during which the core and the clad can solidify to the desired final cross-sectional shapes which can be the same or differ from one another (e.g., circular, D-shape, oval, rectangular, square, etc.). During the cooling, components of the core can separate via solidification, with one solid phase of the cooled core including the primary core material as incorporated in the preform core (i.e., with no chemical alteration to the material). Another solid phase of the cooled core can include the flux material, which can be present in this solid phase as added to the preform or which can be chemically altered during the draw process. For instance, in some embodiments, a second solid phase of the cooled drawn fiber can include a reaction product of the flux material and a portion of the primary core material. In other embodiments, a preform core can include multiple different flux materials, and a solid phase of the cooled drawn fiber can include a reaction product of the different flux materials, optionally in conjunction with one or more additional solid phases that can include a flux material as originally incorporated in the preform core, i.e., an amount of unreacted flux material and/or reacted with a portion of a primary core material.

The fiber 28 can be drawn to any suitable size. In some embodiments, a multi-step draw can be carried out in which a preform 22 is first drawn to a cane having a relatively large cross-section, e.g., about 1 mm or greater in cross-sectional dimension, and then drawn a second time to form a smaller cross-section fiber. For instance, a drawn fiber (either a cane or a smaller fiber) can include a core of between about 1 μm and about 1000 μm in some embodiments.

The fiber 28 can be wound around a take-up reel 34 as it leaves the hot zone 30. The fiber 28 can subsequently be run through a polymer bath (not shown), such that a jacketing material can be coated onto the fiber 28.

In some embodiments, a fiber can be further processed following formation. By way of example, a drawn fiber can be processed by post-formation processing such as thermal treatment, e.g., laser-based thermal gradient treatment, coating, or combinations of different post-formation processing treatments.

Thermal treatment of a fiber, such as by use of a laser, can be used to spatially segregate different phases of a core. Laser-induced thermal treatment can spatially segregate the core phases longitudinally along the fiber length, laterally across the fiber cross-section, radially from the fiber core center out to the clad, or a combination thereof. For instance, a formed fiber can be subjected to heat treatment either globally or locally (e.g., by use of a laser) at a temperature that is less than the softening temperature of the cladding, e.g., at a temperature from about 400° C. to about 600° C., to encourage remelt and crystallization of the core, which can serve to segregate the solid phases of the core. In some instances, the core temperature will need to be in a range from about 800° C. to about 1100° C. for core remelt. In some embodiments, the formed fiber may be subjected to a heat treatment which is instead more than the softening temperature of the cladding, for example, in order to taper the fiber to even smaller dimensions.

Beneficially, disclosed formation methods can be utilized to provide fibers that include high vapor pressure materials in the core according to an MCM formation method. As such, the drawn fibers can be provided in long lengths, e.g., about 1 meter or greater, which is not possible for fibers formed according to other formation approaches. Moreover, the fibers can have a structure that differs from fibers formed by other methods (e.g., no openings across the fiber core, no striations, etc., as are common in fibers formed according to CVD processes) and the fibers can be formed by use of accepted drawing technologies that are easily scalable for use in industry.

The present disclosure may be better understood with reference to the Examples set forth below.

Example 1

Figure 2:
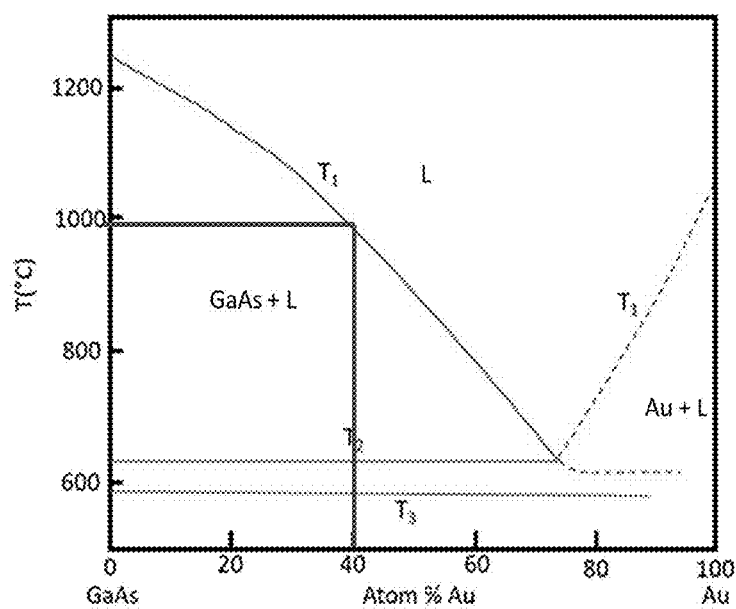
FIG. 2 provides a phase diagram for a GaAs:Au system.

Fibers were formed including GaAs in the core using gold (Au) as a flux material. A phase diagram for the GaAs:Au system is illustrated in FIG. 2. The powders used were GaAs (99.99% metals basis, Alfa Aesar) and Au (99.999% trace metals basis, Strem Chemicals). As can be seen on the phase diagram, the flux formation substantially lowers the possible draw temperatures of the GaAs phase. Drawn fibers were formed with various concentrations of the two components in the core, including GaAs:Au atomic ratios of 60GaAs: 40Au, 50GaAs:50Au, and 55GaAs:45Au.

To form the fibers, the powders were thoroughly mixed in the desired concentrations. Each mixture was then placed inside of a silica ampoule and sealed under vacuum. The sealed ampoule was heated to 1150° C. and held for 2 hours. The resultant preform core rod was extracted and loaded into a borosilicate glass (DURAN®) preform clad with outer diameter of about 30 mm and inner diameter of 3 mm. The GaAs—Au core/DURAN® glass cladding preform was drawn into fiber at a draw temperature of 1100° C.

Figure 3:
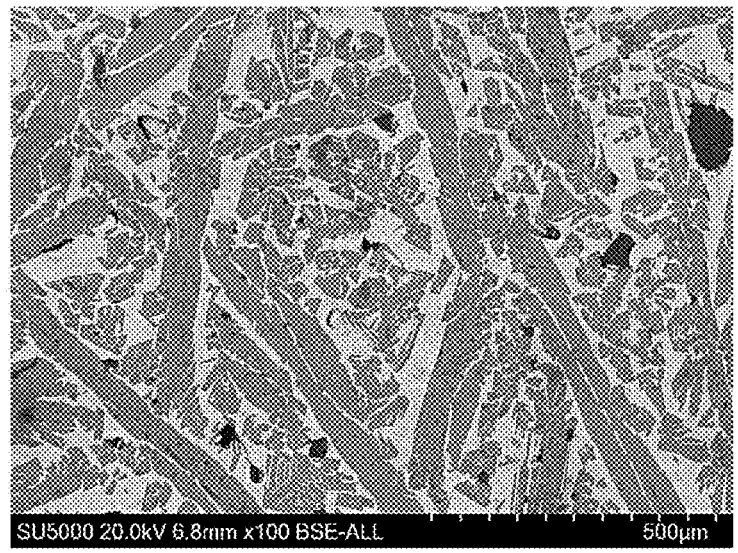
FIG. 3 illustrates a cross-section of another GaAs:Au fiber core formed as described herein.
Figure 4:
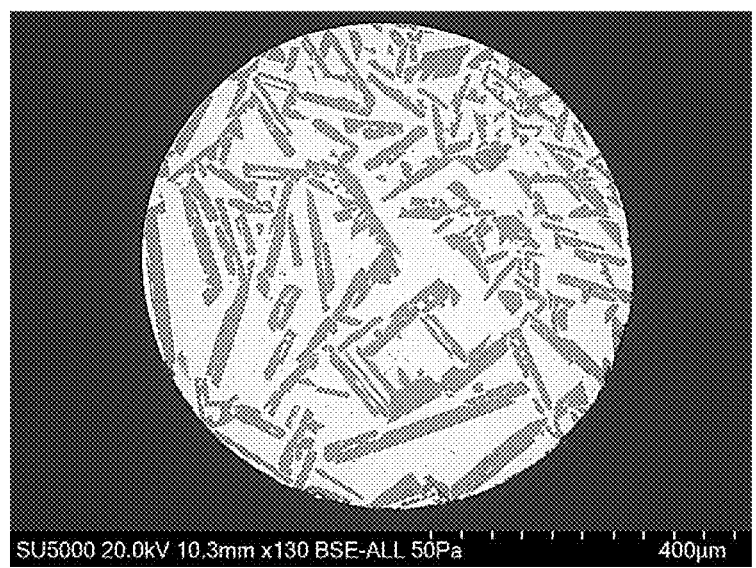
FIG. 4 illustrates a cross-section of another GaAs:Au fiber core formed as described herein.

FIG. 3 provides an image of a 60GaAs:40Au non-quenched core and FIG. 4 provides an image of a 60GaAs: 40Au quenched core. As shown, the cores include the separated solid phases.

Figure 5:
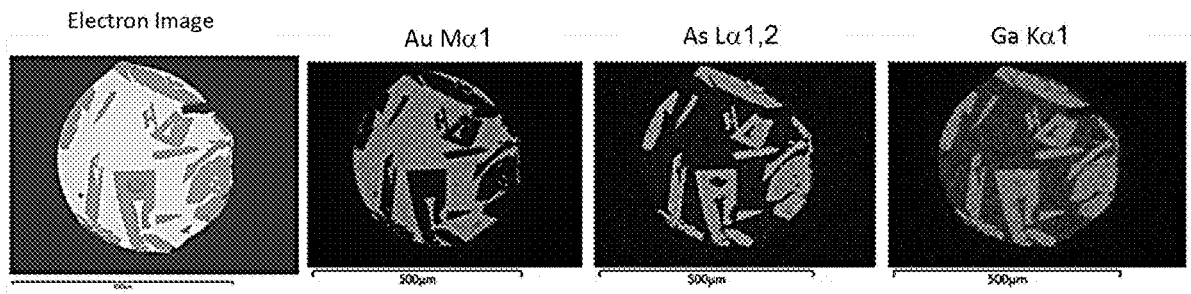
FIG. 5 illustrates scanning electron microscope energy dispersive X-ray (SEM-EDX) elemental analysis results of GaAs:Au fibers formed as described herein.
Figure 6:
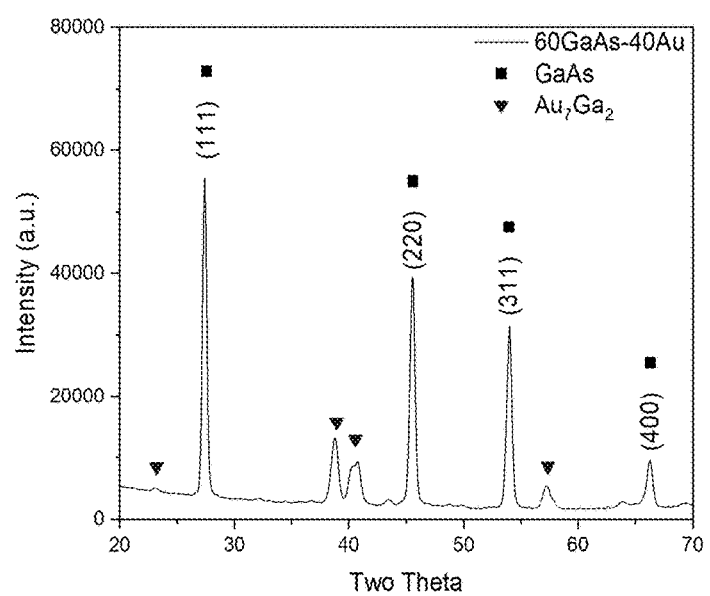
FIG. 6 provides X-ray Diffraction (XRD) results of GaAs: Au fibers formed as described herein.

FIG. 5 provides SEM-EDX elemental analysis results of a typical GaAs:Au fiber. As shown, a clear presence of GaAs along with Au was detected. The XRD results (FIG. 6) show presence of GaAs and $Au_7Ga_2$ phases in the core. The $Au_7Ga_2$ phase has a low melting point, which is favorable for post-formation thermal processing of the fiber.

Example 2

Figure 7:
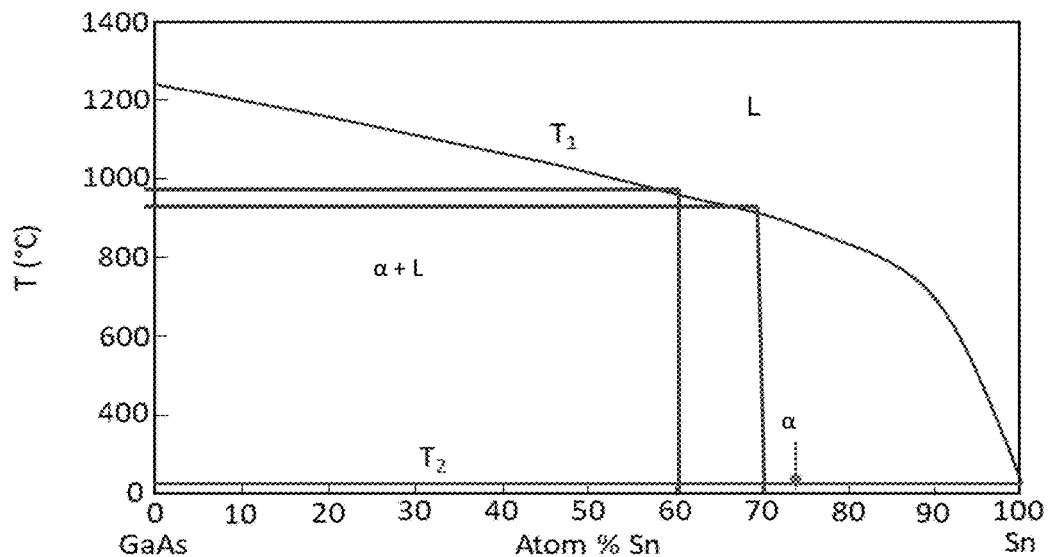
FIG. 7 provides a phase diagram for a GaAs:Sn system.

Fibers were formed including GaAs in the core using tin (Sn) as a flux material. A phase diagram for the system is illustrated in FIG. 7. The powders used were GaAs (99.99% metals basis, Alfa Aesar) and metallic Sn (99.995% trace metals basis, Alfa Aesar). Drawn fibers were formed including GaAs and Sn in the core in atomic concentrations of 30GaAs:70S and 40GaAs:60Sn. The composition concentrations were chosen to be within a melt temperature range of about 915° C.-970° C. for the mixed flux.

To form the fibers, the powders were thoroughly mixed in the desired concentrations. The mixture was placed inside of a silica ampoule and sealed under vacuum. The sealed ampoule was heated to 1050° C. and held for 2 hours. The resultant core rod was then extracted and loaded into a borosilicate glass (DURAN®) preform clad with outer diameter of about 30 mm and inner diameter of 3 mm. The draw temperature was set to 1010° C. for the 30GaAs:70Sn fiber and 1040° C. for the 40GaAs:60Sn fiber. These temperatures are within the draw temperature range for the clad material.

Figure 8:
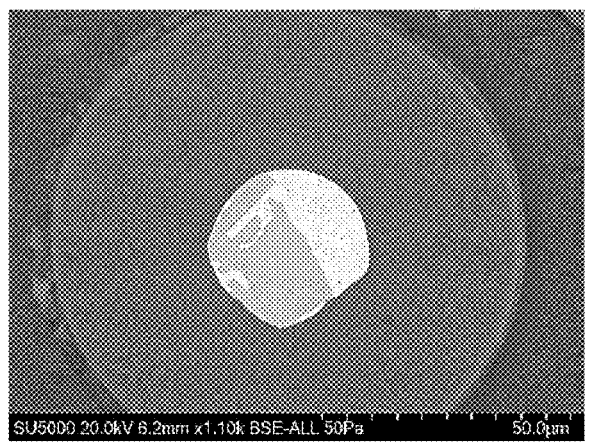
FIG. 8 illustrates a cross-section of a GaAs:Sn fiber core formed as described herein.
Figure 9:
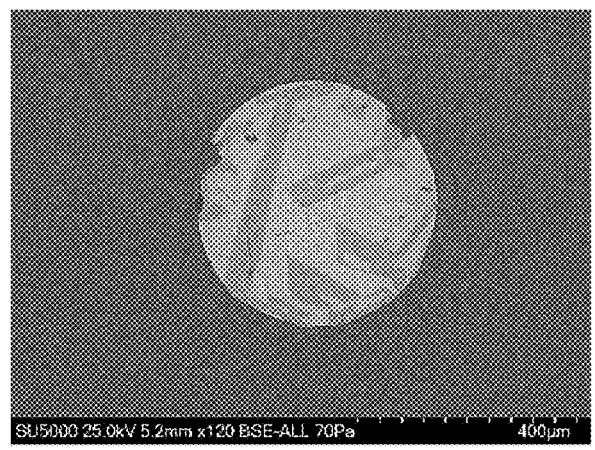
FIG. 9 illustrates a cross-section of another GaAs:Sn fiber core formed as described herein.

The 30GaAs:70Sn composition was drawn completely to fiber. FIG. 8 provides an image of the core of a 30GaAs:70Sn fiber and FIG. 9 provides an image of the core of a larger (about 3 mm outer diameter) 30GaAs:70Sn fiber formed as described. The 40GaAs:60Sn composition was first drawn to about 1 meter of large diameter fiber and then further drawn to collect about 10 m of smaller diameter fiber.

Figure 10:
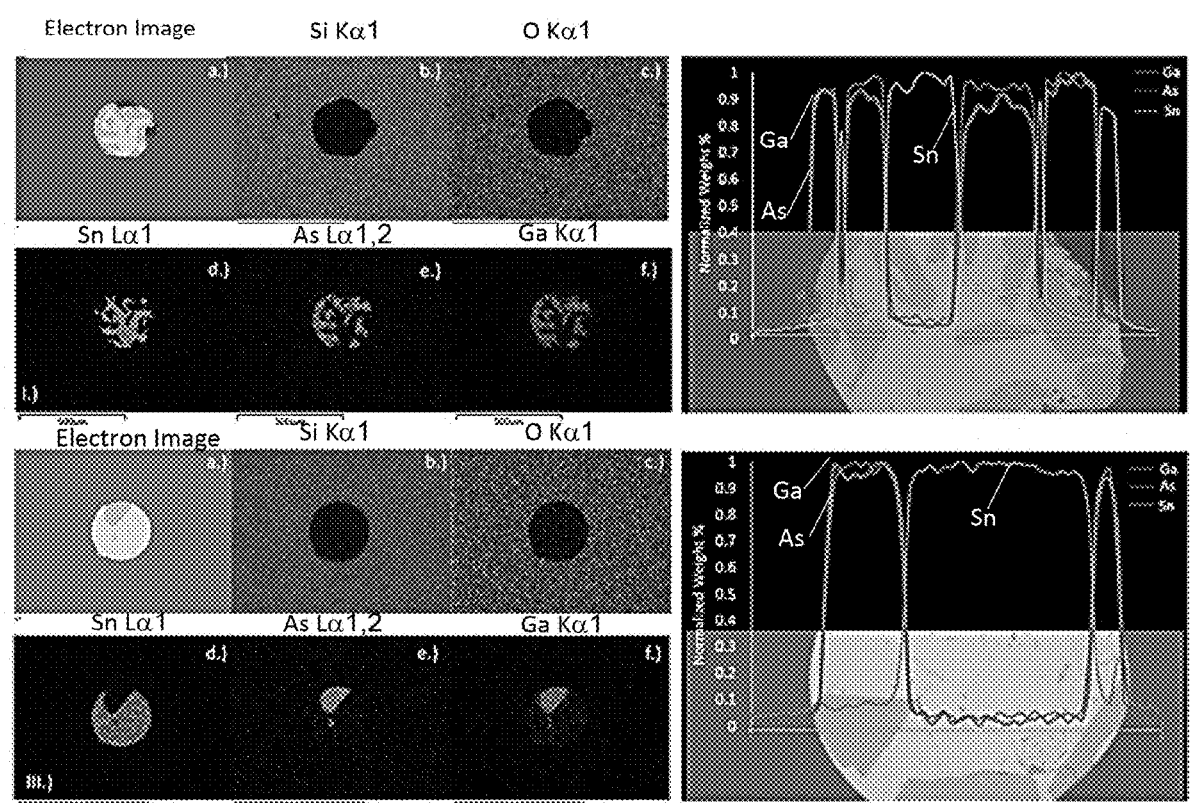
FIG. 10 provides SEM-EDX elemental analysis results of GaAs:Sn fibers formed as described herein.
Figure 11:
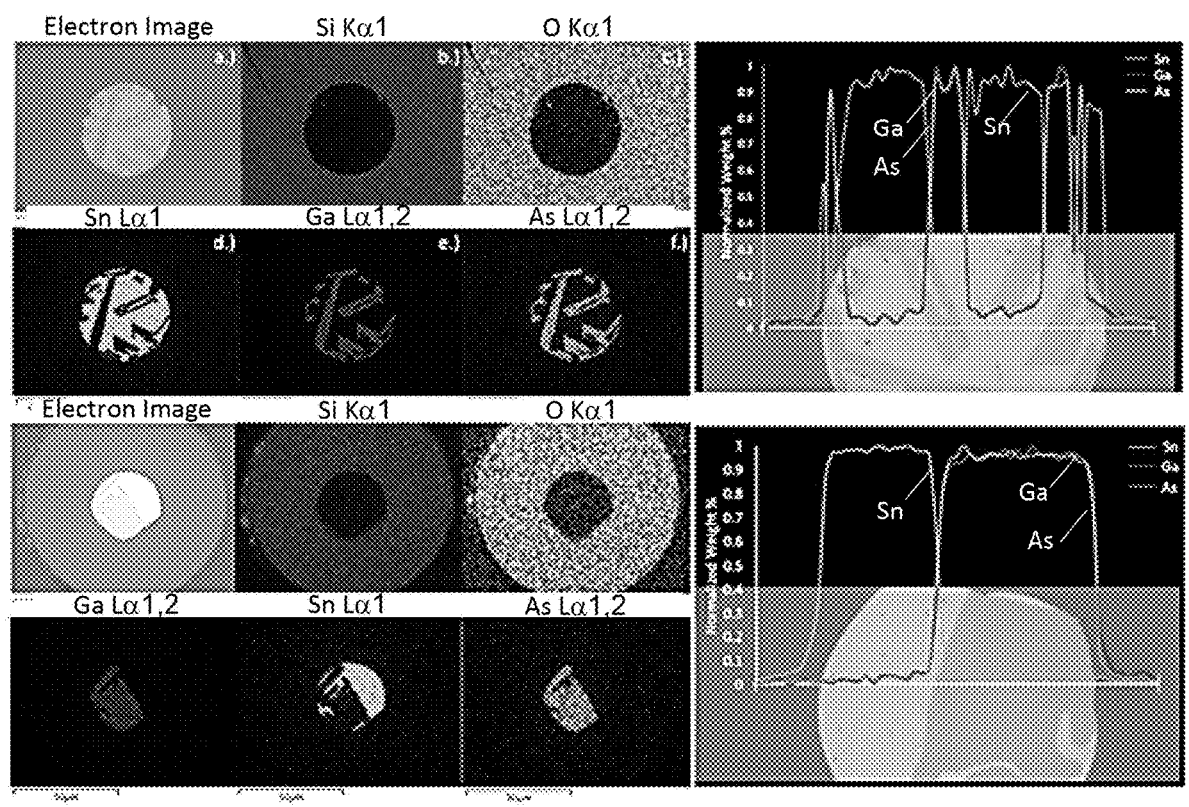
FIG. 11 provides SEM-EDX elemental analysis results of GaAs:Sn fibers formed as described herein.

FIG. 10 and FIG. 11 provide SEM analysis results of the 30GaAs:70Sn (FIG. 10) and 40GaAs:60Sn (FIG. 11) fibers. The elemental line scans in each of the figures shows the presence of GaAs and Sn phases in the core of the samples and there is a clear indication between the GaAs and the Sn regions in the formed fibers.

Figure 12:
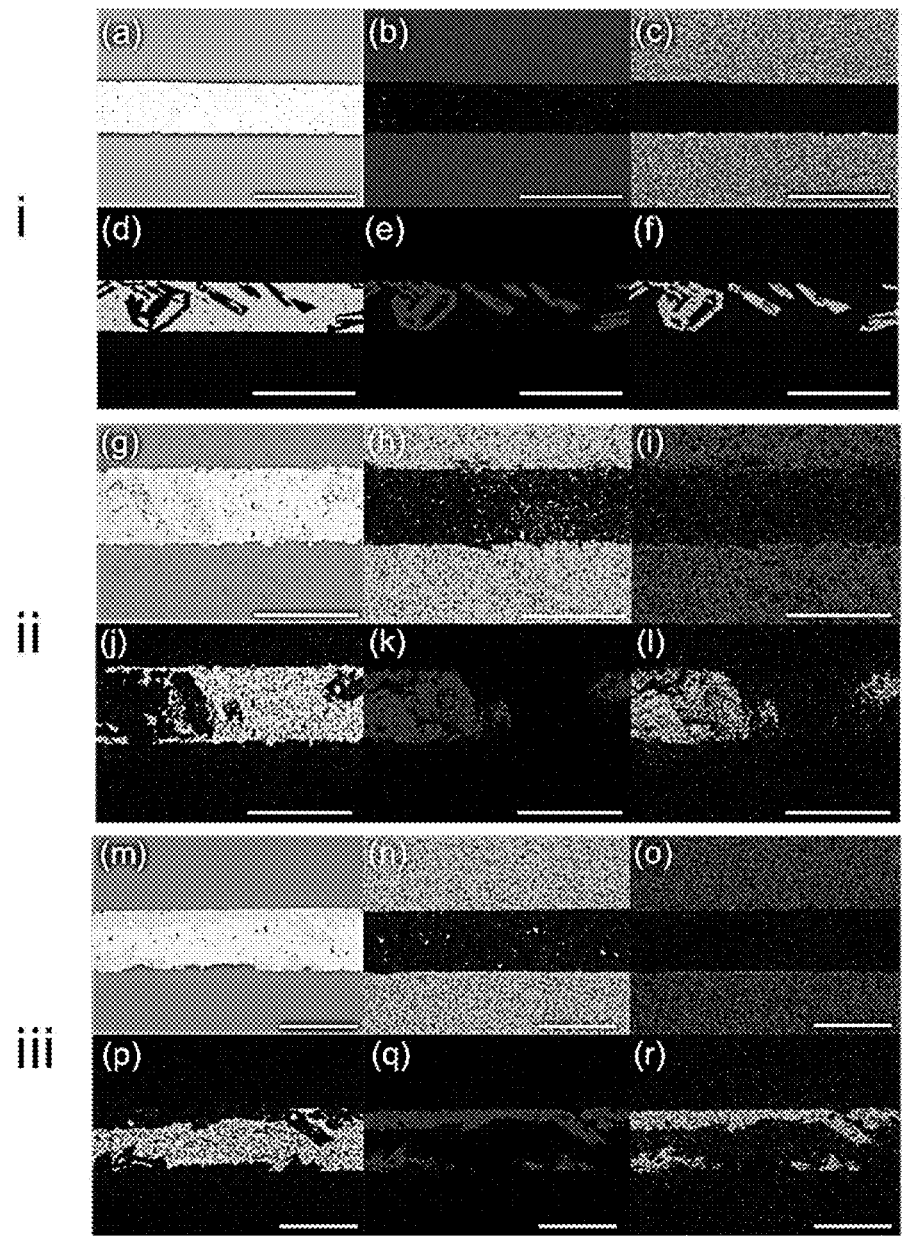
FIG. 12 provides SEM-EDX elemental analysis results of GaAs:Sn fibers formed as described herein.

FIG. 12 presents SEM micrographs and EDX elemental maps of a 1 mm diameter 30GaAs:70Sn core fiber. Group I (top) represent as-drawn fiber (no thermal treatment): (a) SEM micrograph and EDX maps for (b) Si, (c) O, (d) Sn, (e) Ga, (f) As. Group ii represent longitudinally laser thermal treated fiber: (g) SEM micrograph and EDX maps for (h) Si, (i) O, (j) Sn, (k) Ga, (l) As. Group iii represent laterally laser thermal treated fiber: (m) SEM micrograph and (n) Si, (o) O, (p) Sn, (q) Ga, (r) As. The scale bar in all cases is 250 µm.

Figure 13:
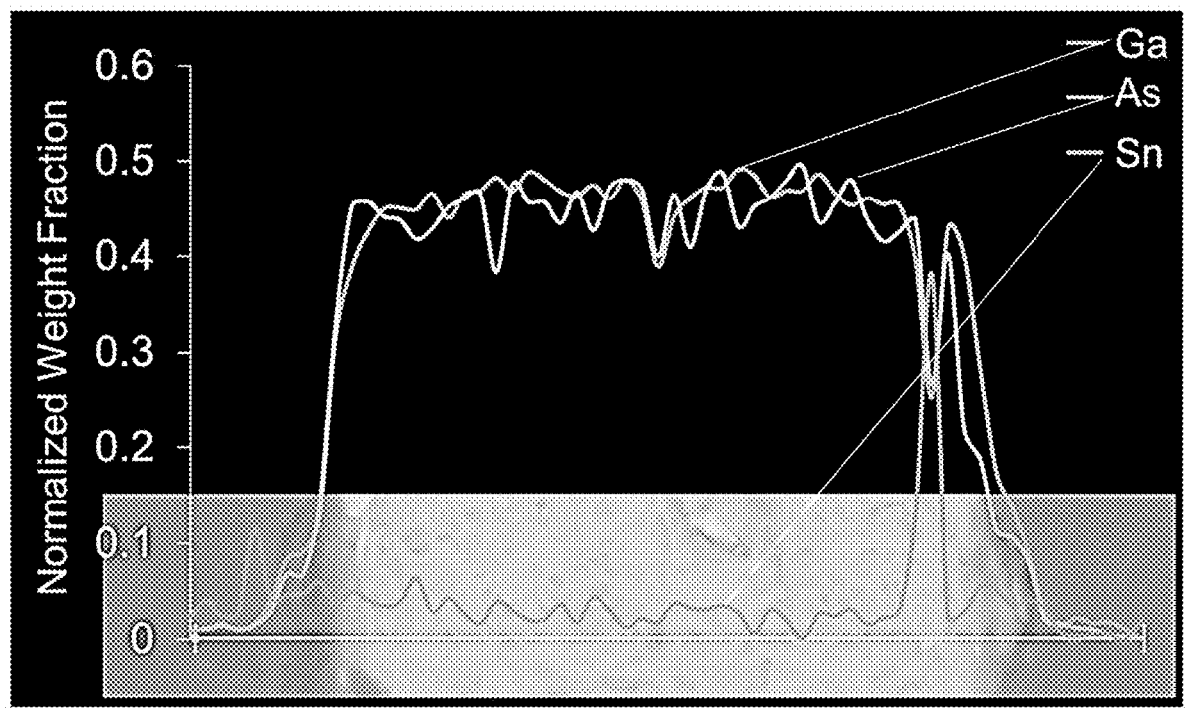
FIG. 13 provides line scan results of a GaAs:Sn fiber formed as described herein.

A linescan of a 30GaAs:70Sn 1 mm diameter fiber is shown in FIG. 13. The various lines indicate the presence of Ga, As, and Sn, as indicated.

Figure 14:
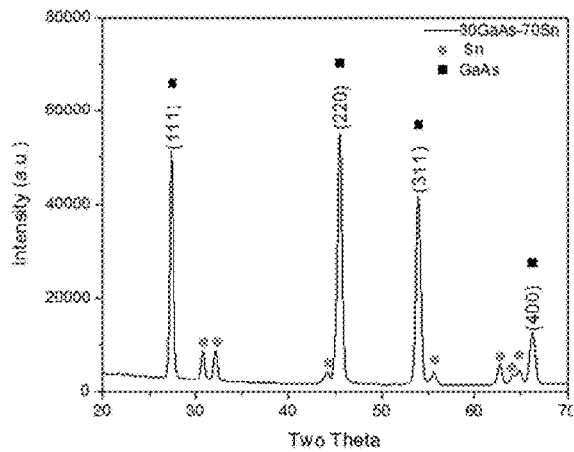
FIG. 14 provides XRD results for a GaAs:Sn fiber formed as described herein prior to and following thermal treatment.
Figure 14:
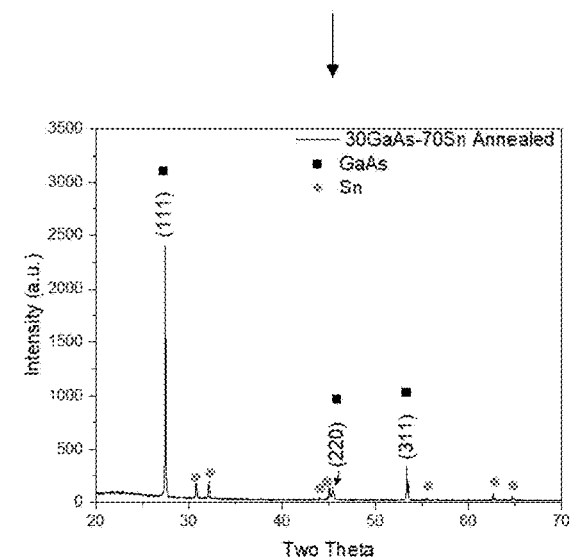
Figure 15:
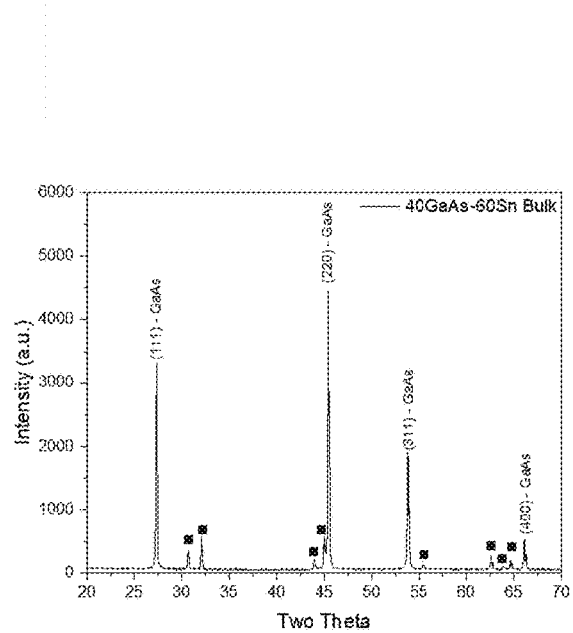
FIG. 15 provides XRD results for a bulk GaAs:Sn fiber material.
Figure 16:
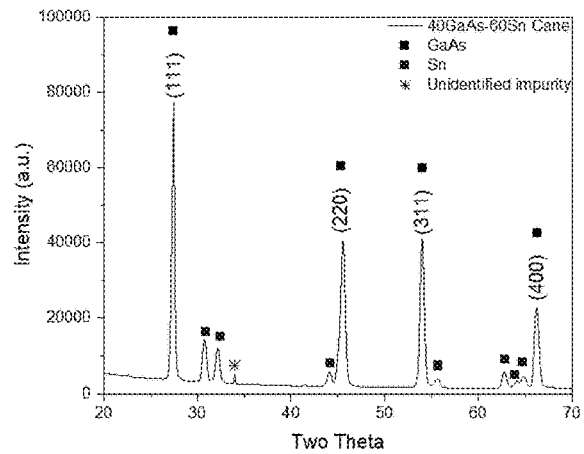
FIG. 16 provides XRD results for a GaAs:Sn fiber formed as described herein.
Figure 17:
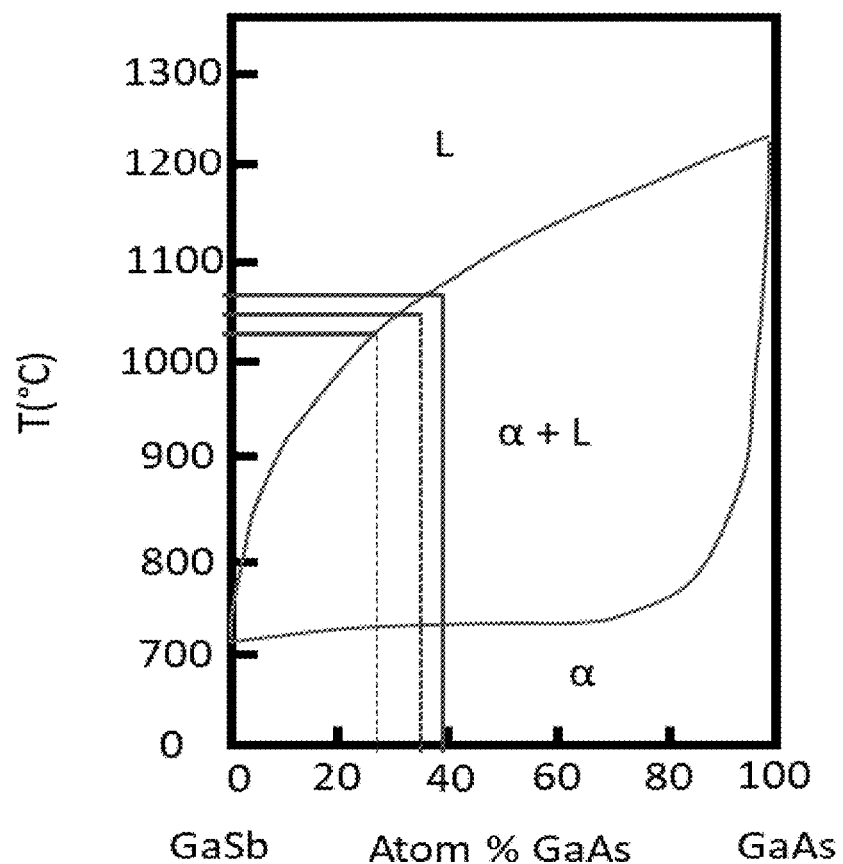
FIG. 17 provides a phase diagram for a GaAs:GaSb system.

XRD results are illustrated in FIG. 14, FIG. 15, and FIG. 16. FIG. 14 includes the results for a 30GaAs:70Sn fiber prior to and following thermal treatment, FIG. 15 shows the results for a 40GaAs:60Sn bulk material, and FIG. 16 shows the results for a drawn 40GaAs:60Sn fiber. The XRD results provide confirmation of both the GaAs and Sn phases present in the materials.

Example 3

Figure 18:
FIG. 18 illustrates a cross-section of a GaAs:GaSb fiber core formed as described herein.

Fibers were formed including GaAs in the core using gallium antimonide (GaSb) as a flux material. A phase diagram for the system is illustrated in FIG. 18. The powders used were GaAs (99.99% metals basis, Alfa Aesar) and GaSb (99.99% trace metals basis, Alfa Aesar). Drawn fibers were formed including GaAs and GaSb in the core in atomic concentrations of 40GaAs:60GaSb, 35GaAs:65GaSb, and 25GaAs:75GaSb.

To form the fibers, the powders were thoroughly mixed in the desired concentrations. The mixture was placed inside of a silica ampoule and sealed under vacuum. The sealed ampoule was heated to 1150° C. and held for 3 hours. The resultant core rod was then extracted and loaded into a borosilicate glass (DURAN®) preform clad with outer diameter of about 30 mm and inner diameter of 3 mm. The draw temperature was set to 1100° C.

Figure 19:
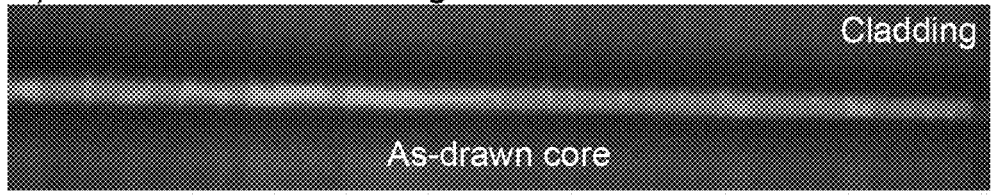
FIG. 19 provides images of GaAs:GaSb fibers prior to and following thermal treatment.
Figure 19:
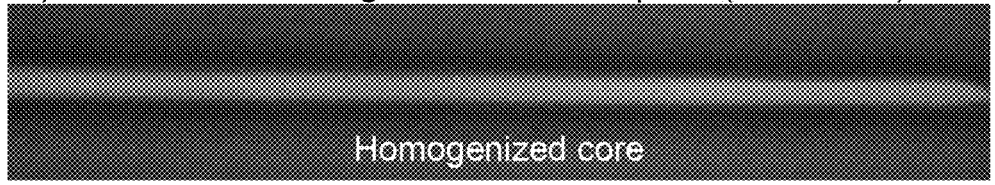
Figure 19:
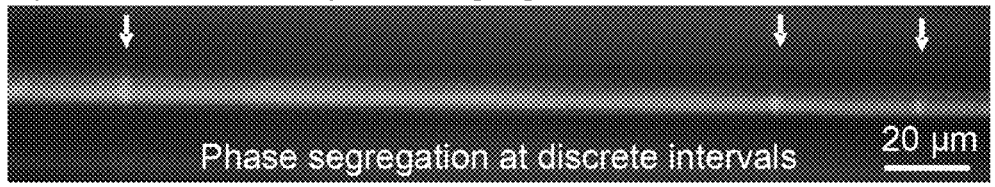
Figure 20:
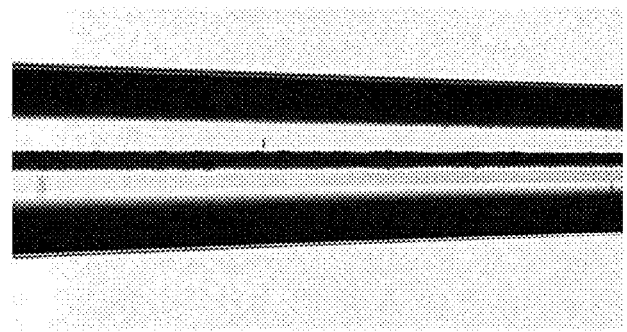
FIG. 20 illustrates a GaAs:GaSb fiber following tapering.

An image of the resulting 35GaAs:65GaSb core material is shown in FIG. 18. For all materials, good fiber was able to be drawn. FIG. 19 provides longitudinal images of a fiber as-drawn (top) and following laser thermal treatment at a scan speed of 0.16 mm/s (middle), which homogenized the core. The bottom image of FIG. 19 is following laser-driven phase segregation, and the phase segregation of the core materials at discrete intervals can clearly be seen. FIG. 20 shows a fiber following successful tapering of the fiber.

Figure 21:
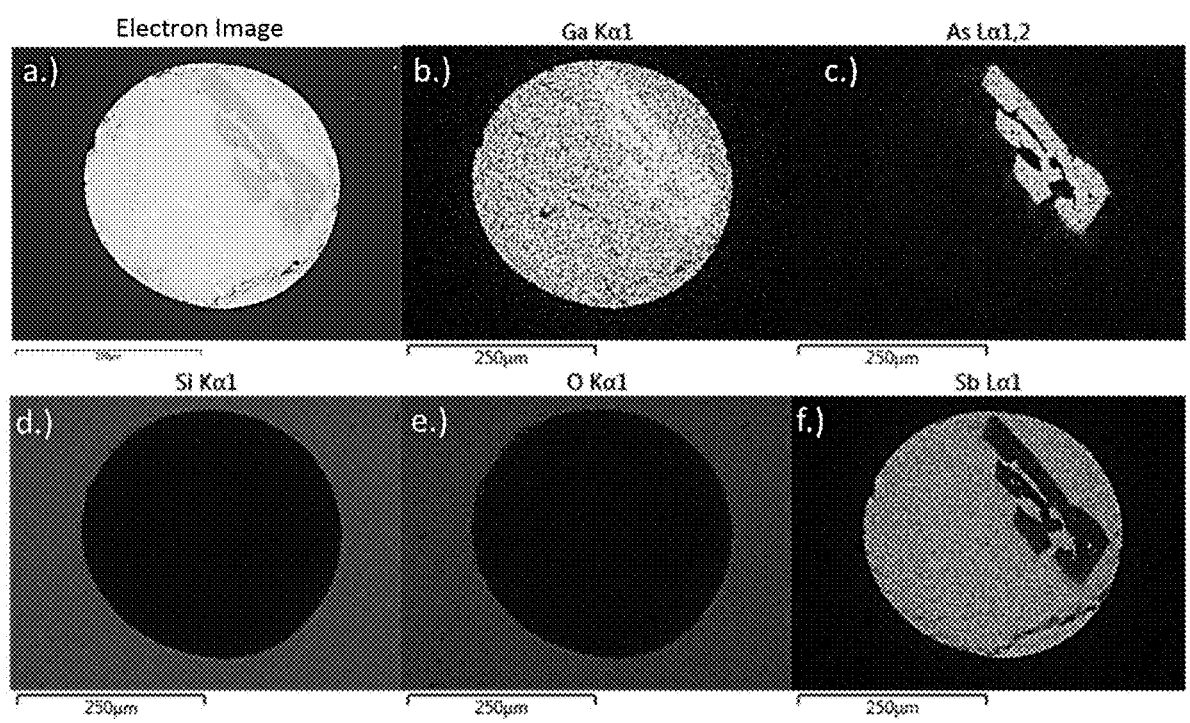
FIG. 21 provides SEM elemental analysis results of GaAs:GaSb fibers formed as described herein.

SEM analysis results of a 35GaAs:65GaSb fiber are provided in FIG. 21. The analysis shows clear evidence of GaAs and GaSb in the core of the 3 mm outer diameter fiber.

Example 4

Figure 22:
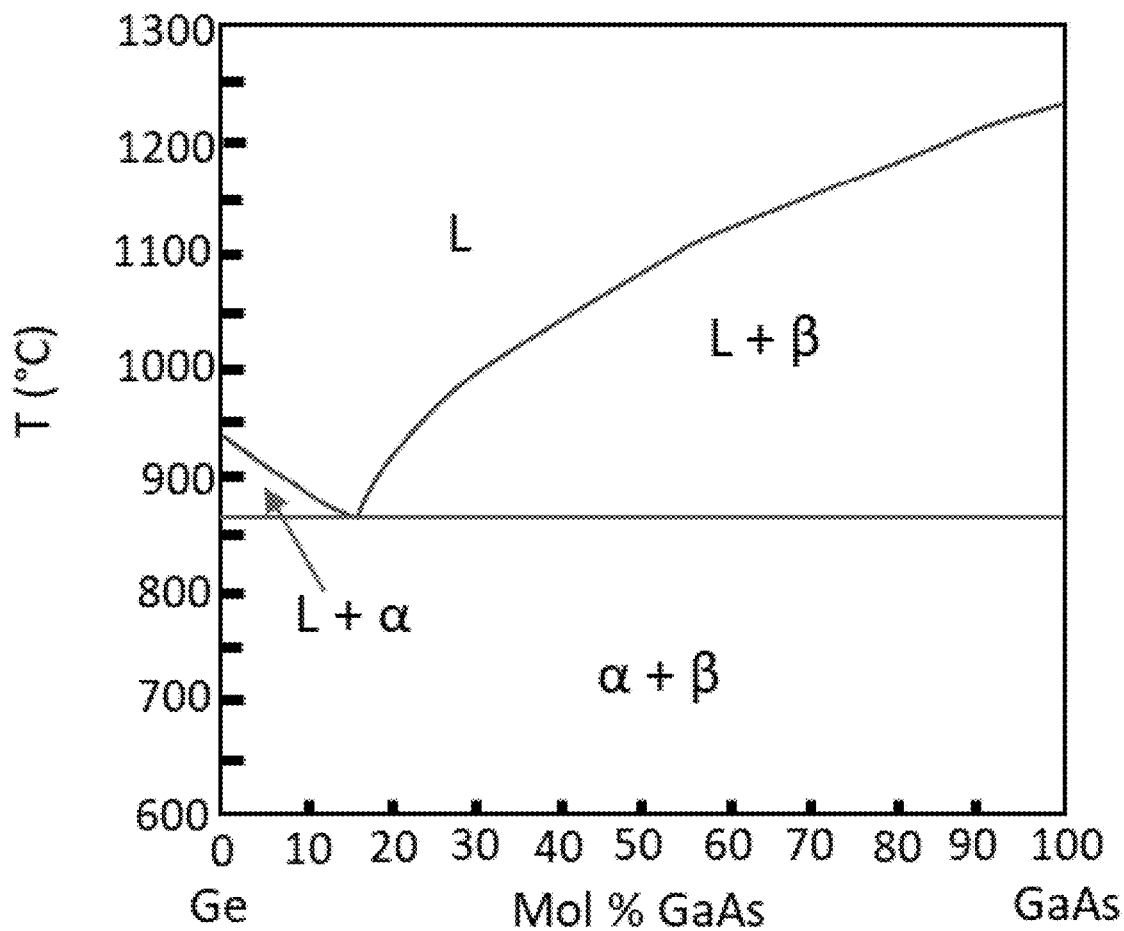
FIG. 22 provides a phase diagram for a GaAs:Ge system.

Fibers were formed including GaAs in the core using germanium (Ge) as a flux material. A phase diagram for the GaAs:Ge system is illustrated in FIG. 22. The powders used were GaAs (99.99% metals basis, Alfa Aesar) and Ge (99.999% trace metals basis, Alfa Aesar). Drawn fibers were formed with a 30GaAs:70Ge atomic ratio in the core.

Figure 23:
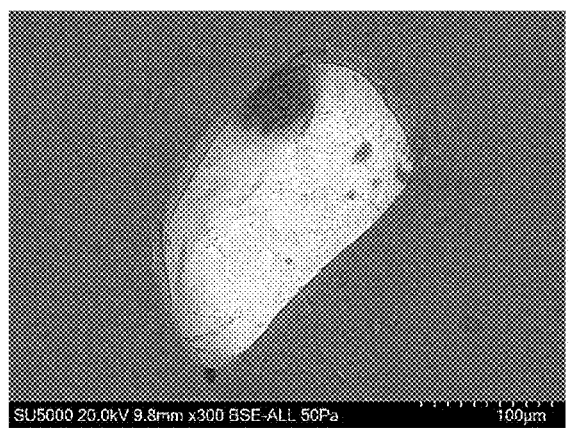
FIG. 23 illustrates a cross-section of a GaAs:Ge fiber formed as described herein.

To form the fibers, the powders were thoroughly mixed in the desired concentration. The mixture was placed inside of a silica ampoule and sealed under vacuum. The sealed ampoule was heated to 1200° C. and held for 1.5 hours, and the resultant core rod was then extracted and loaded into a borosilicate glass (DURAN®) preform clad with outer diameter of about 30 mm and inner diameter of 3 mm. The draw temperature was set to 1100° C. FIG. 23 provides a cross-sectional image of a formed fiber.

Example 5

Figure 24:
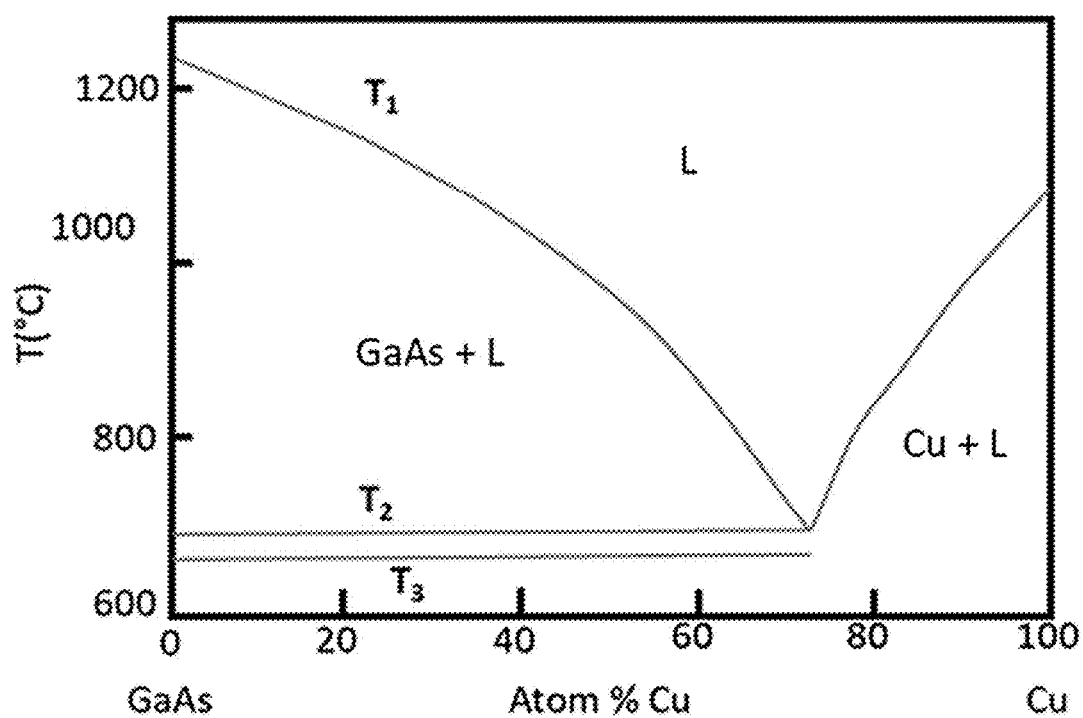
FIG. 24 provides a phase diagram for a GaAs:Cu system.

Fibers were formed including GaAs in the core using copper (Cu) as a flux material. A phase diagram for the system is illustrated in FIG. 24. The powders used were GaAs (99.99% metals basis, Alfa Aesar) and metallic Cu (99.995% trace metals basis, Aldrich). Drawn fibers were formed with a 40GaAs:60Cu atomic ratio in the core.

To form the fibers, the powders were thoroughly mixed in the desired concentration. The mixture was placed inside of a silica ampoule and sealed under vacuum. The sealed ampoule was heated to 1050° C. and held for 3 hours, and the resultant core rod was then extracted and loaded into a borosilicate glass (DURAN®) preform clad with outer diameter of about 30 mm and inner diameter of 3 mm. The draw temperature was set to 1100° C.

Figure 25:
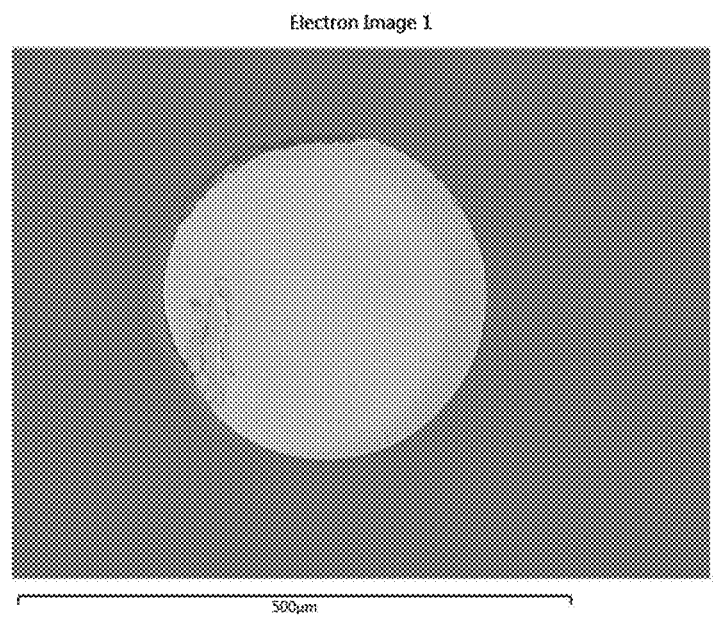
FIG. 25 illustrates a cross-section of a GaAs:Cu fiber formed as described herein.
Figure 26:
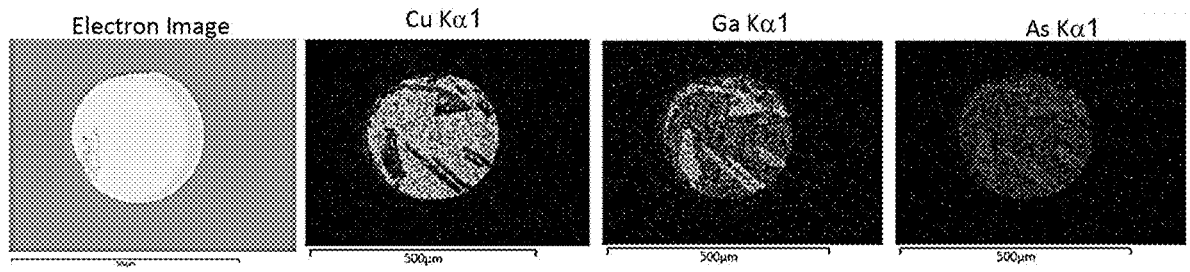
FIG. 26 provides SEM elemental analysis results of a GaAs:Cu fiber formed as described herein.
Figure 27:
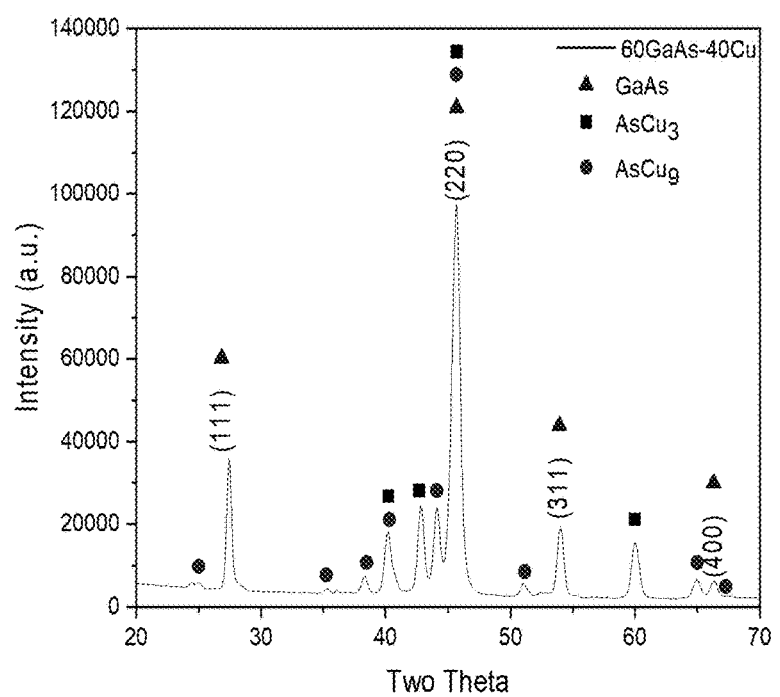
FIG. 27 provides XRD results for a GaAs:Cu fiber formed as described herein.

FIG. 25 provides a cross-sectional image of a formed fiber. SEM elemental results are shown in FIG. 26, demonstrating a clear presence of GaAs along with Cu. XRD results are illustrated in FIG. 27, showing GaAs, $AsCu_3$, and $AsCu_9$ phases present in the core. Both of these flux phases have lower melting temperatures than the GaAs volatile phase, which is important for post-processing of the GaAs phase.

Example 6

Figure 28:
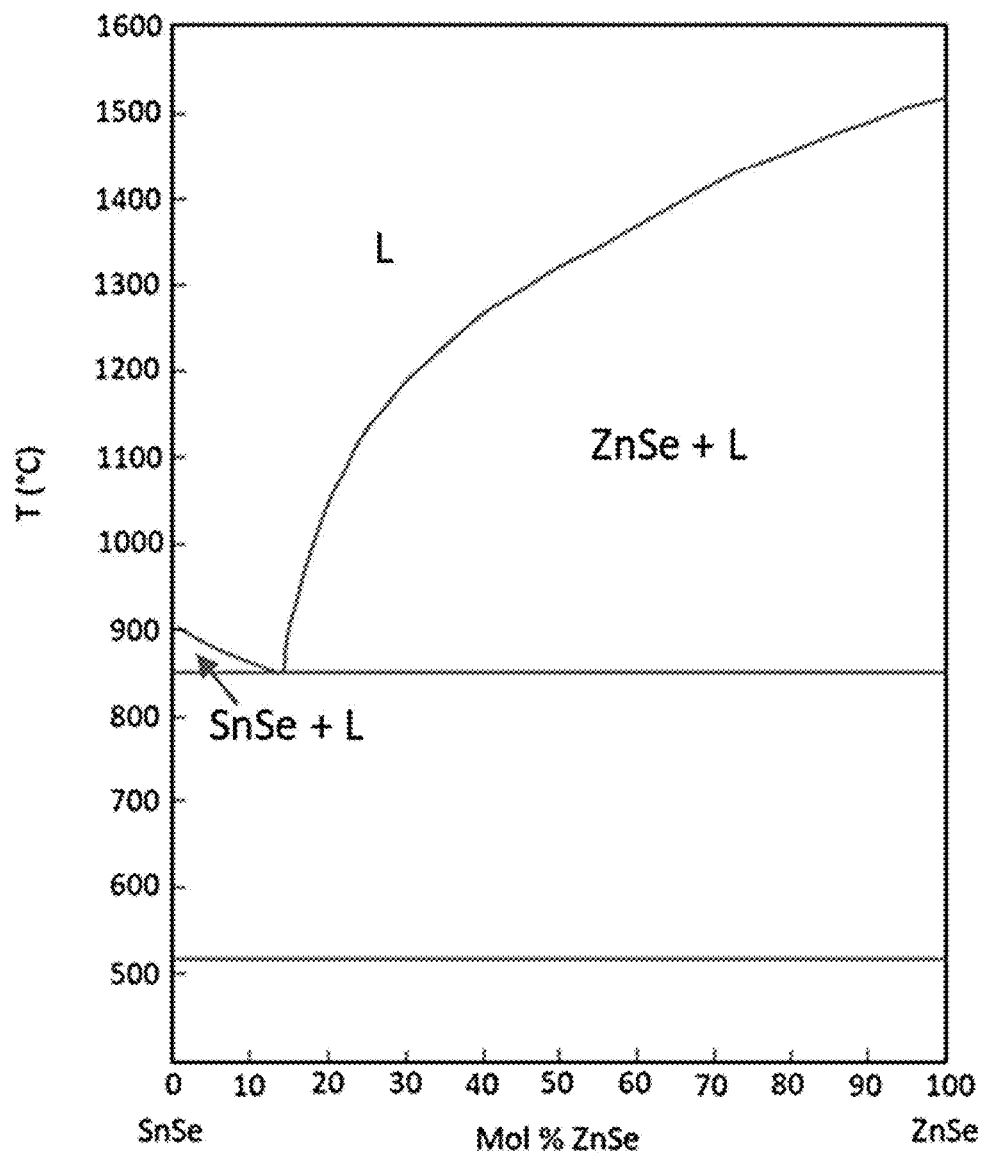
FIG. 28 provides a phase diagram for a ZnSe:SnSe system.

Fibers were formed including ZnSe in the core using tin selenide (SnSe) as a flux material. A phase diagram for the system is illustrated in FIG. 28. The powders used were ZnSe (99.99% metals basis, Alfa Aesar) and SnSe (99.999% trace metals basis, Bean Town Chemicals). Drawn fibers were formed with a 18ZnSe:82SnSe atomic ratio in the core.

To form the fibers, the powders were thoroughly mixed in the desired concentration. The mixture was placed inside of a silica ampoule and sealed under vacuum. The sealed ampoule was heated to 1175° C. and held for 3 hours. The resultant core rod was then extracted and loaded into a borosilicate glass (DURAN®) preform clad with outer diameter of about 30 mm and inner diameter of 3 mm. The draw temperature was set to 1100° C. The composition selection was based upon the melting point for the system at 1000° C.

Figure 29:
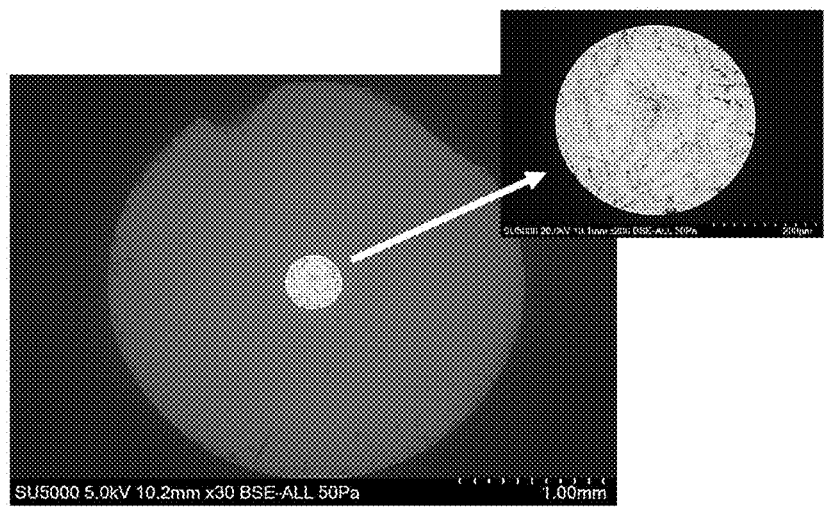
FIG. 29 illustrates a cross-section of a ZnSe:SnSe fiber formed as described herein.
Figure 30:
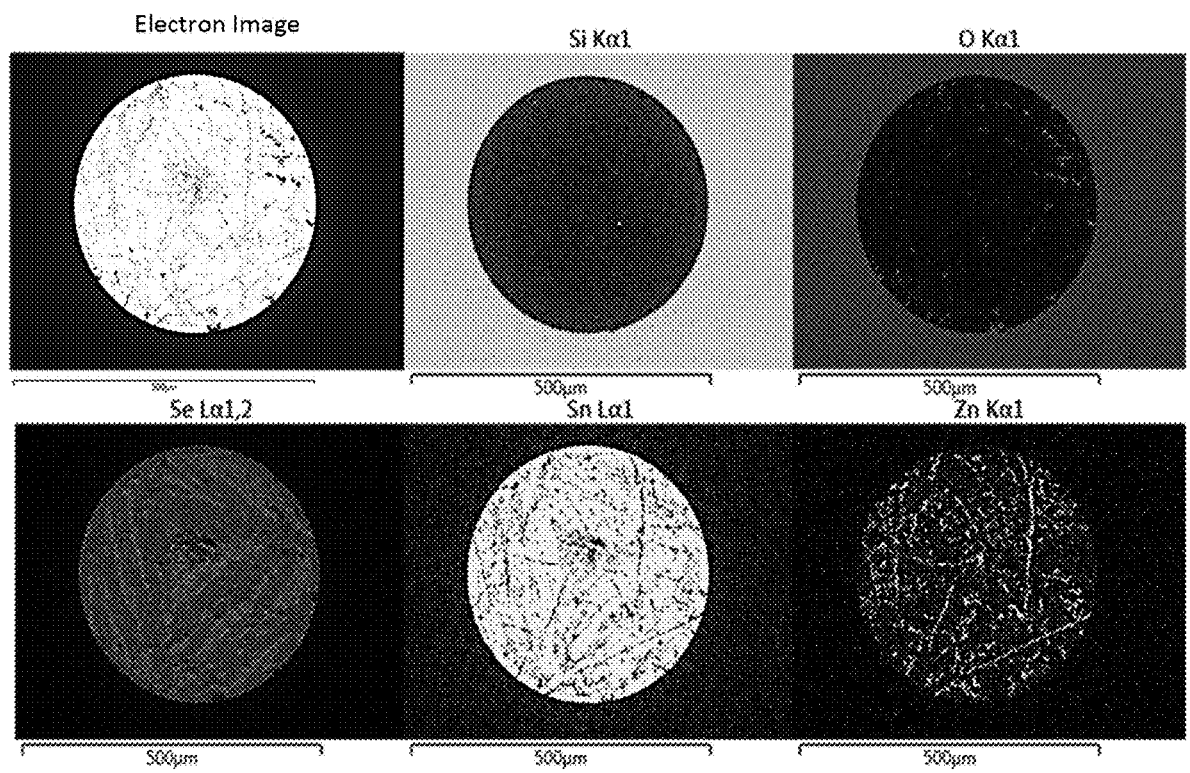
FIG. 30 provides SEM elemental analysis results of a ZnSe:SnSe fiber formed as described herein.

FIG. 29 provides a cross-sectional image of a formed fiber. SEM elemental results are shown in FIG. 30l. There was clear evidence of ZnSe present in the core, though in moderate quantities due to the small amount of starting material.

Example 7

Figure 31:
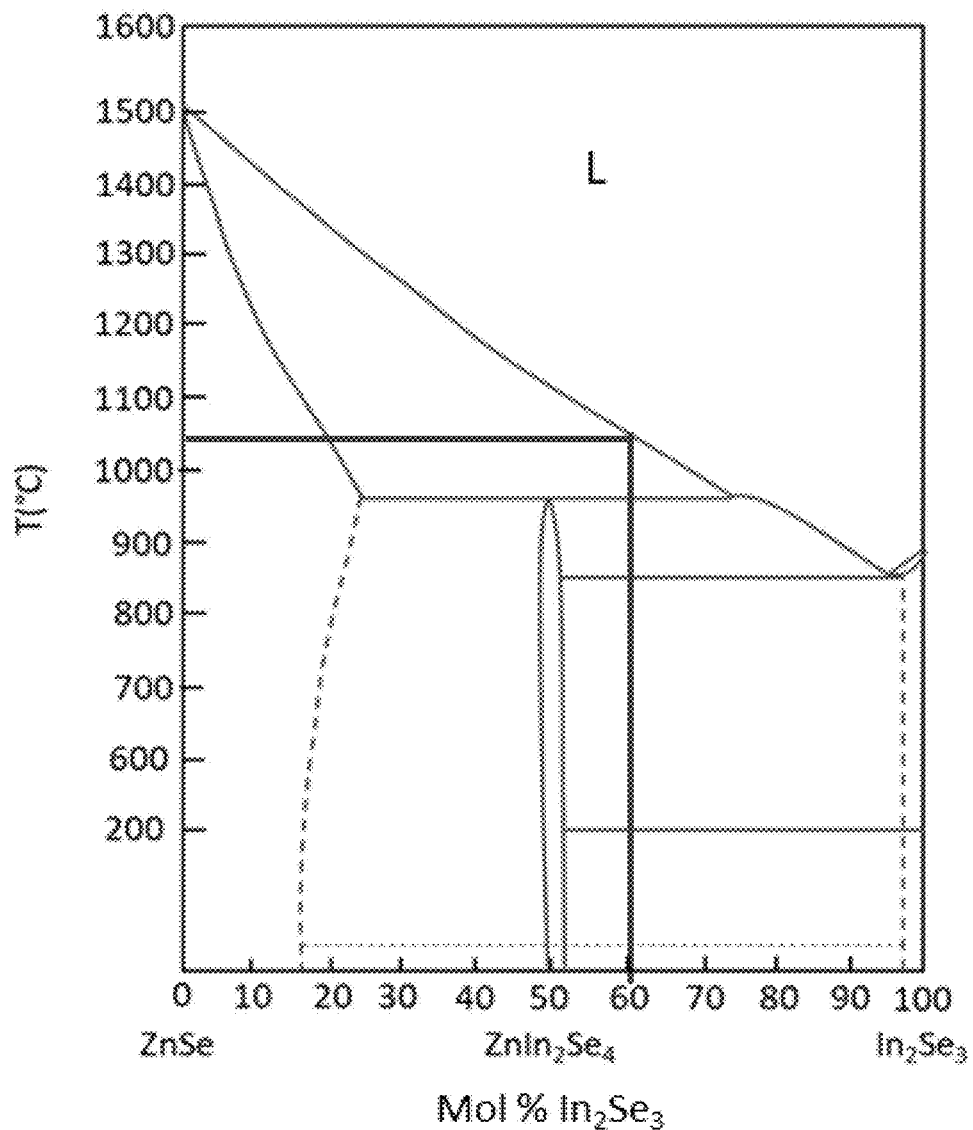
FIG. 31 provides a phase diagram for a ZnSe:In$_2$Se$_3$ system.

Fibers were formed including ZnSe in the core using indium selenide ($In_2Se_3$) as a flux material. A phase diagram for the system is illustrated in FIG. 31. The powders used were ZnSe (99.99% metals basis, Alfa Aesar) and $In_2Se_3$ (99.999% trace metals basis, Alfa Aesar). Drawn fibers were formed with a 40ZnSe:60 $In_2Se_3$ atomic ratio in the core.

To form the fibers, the powders were thoroughly mixed in the desired concentrations. The mixture was placed inside of a silica ampoule and sealed under vacuum. The sealed ampoule was heated to 1050° C. and held for 2.5 hours. The resultant core rod was then extracted and loaded into a borosilicate glass (DURAN®) preform clad with outer diameter of about 30 mm and inner diameter of 3 mm. The draw temperature was set to 1100° C. The composition selection was based upon the melting point for the system at 1040° C.

Figure 32:
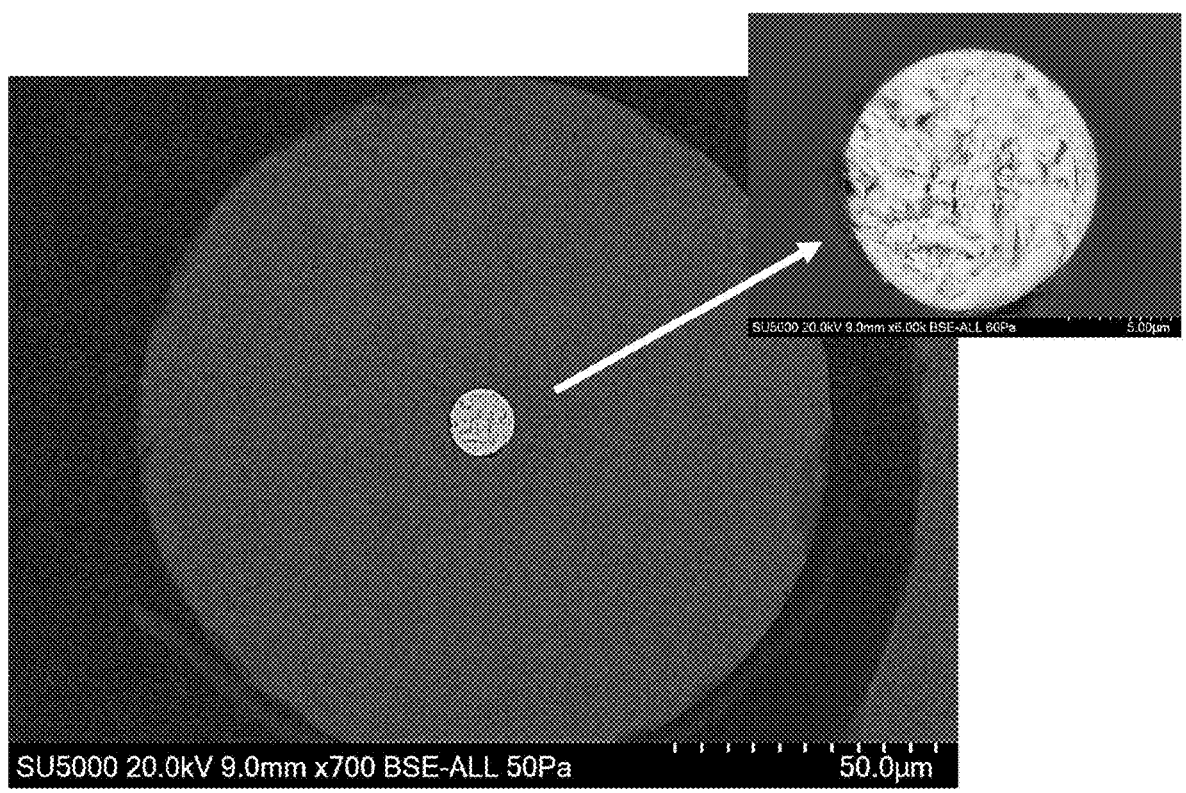
FIG. 32 illustrates a cross-section of a ZnSe:In$_2$Se$_3$ fiber formed as described herein.
Figure 33:
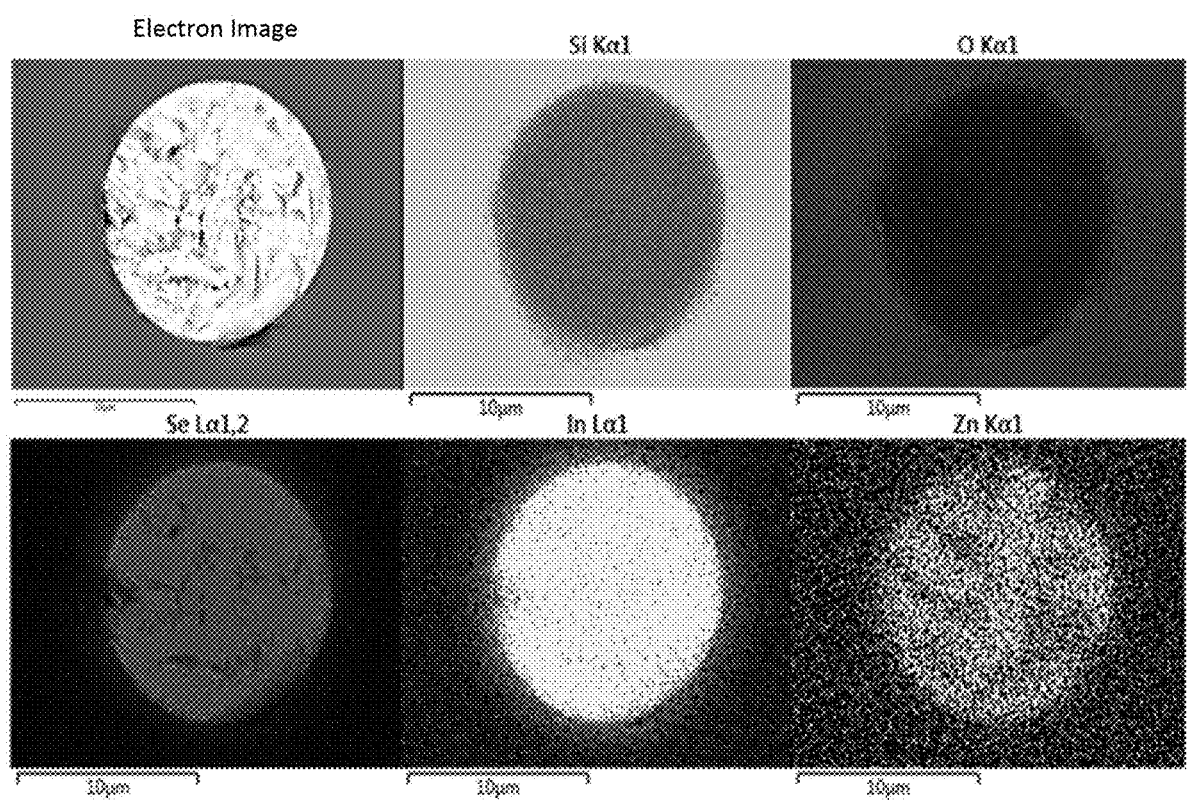
FIG. 33 provides SEM elemental analysis results of a ZnSe:In$_2$Se$_3$ fiber formed as described herein.
Figure 34:
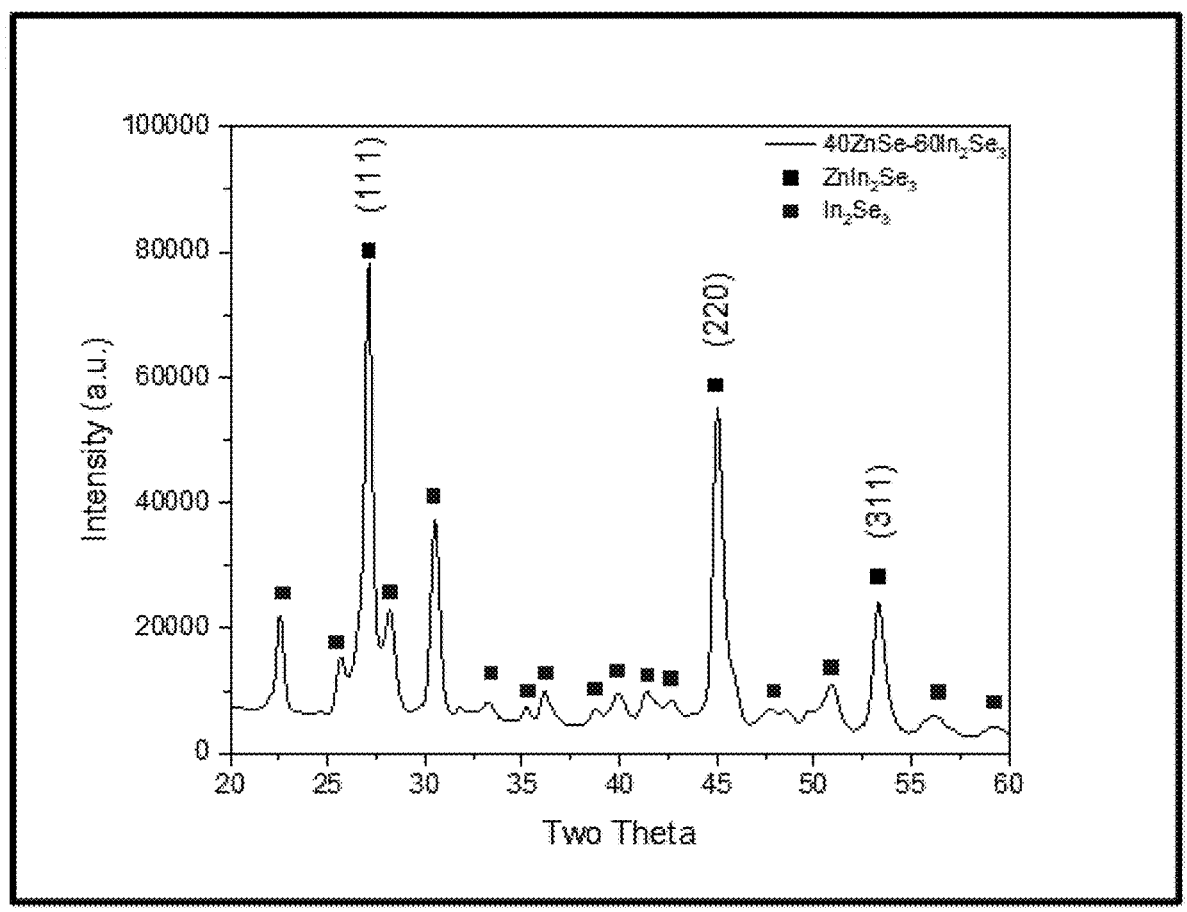
FIG. 34 provides XRD results for a ZnSe:In$_2$Se$_3$ fiber formed as described herein.

FIG. 32 provides a cross-sectional image of a formed fiber. SEM elemental results are shown in FIG. 33, demonstrating a clear presence of ZnSe. The two phases were present but mixed fairly homogeneously throughout the core. XRD results are illustrated in FIG. 34, showing ZnSe and $In_2Se_3$ phases present in the core. The composition fell into the $ZnIn_2Se_4$—$In_2Se_3$ phase field.

Example 8

Figure 35:
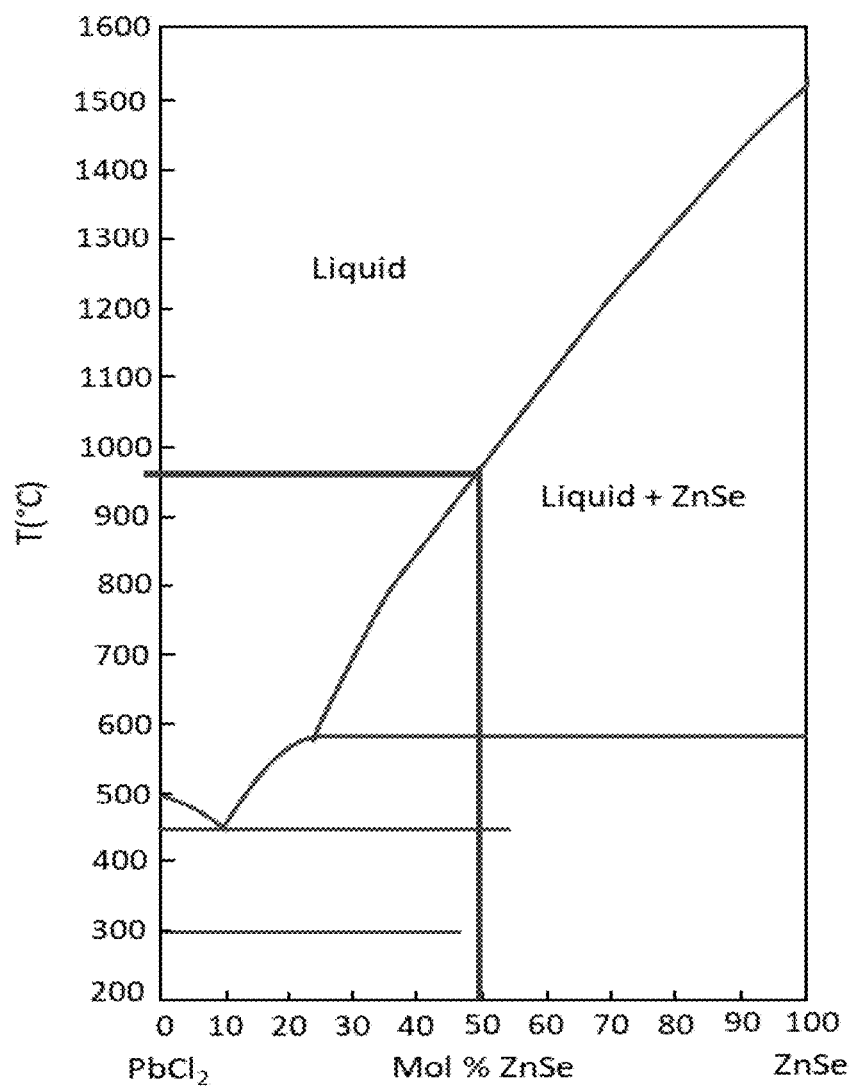
FIG. 35 provides a phase diagram for a ZnSe:PbCl$_2$ system.

Fibers were formed including ZnSe in the core using lead chloride ($PbCl_2$) as a flux material. A phase diagram for the system is illustrated in FIG. 35. The powders used were ZnSe (99.99% metals basis, Alfa Aesar) and $PbCl_2$ (99.99% trace metals basis, Alfa Aesar). Drawn fibers were formed with a 50ZnSe:50$PbCl_2$ atomic ratio in the core.

To form the fibers, the powders were thoroughly mixed in the desired concentrations. The mixture was placed inside of a silica ampoule and sealed under vacuum. The sealed ampoule was heated to 1100° C. and held for 2 hours. The resultant core rod was then extracted and loaded into a borosilicate glass (DURAN®) preform clad with outer diameter of about 30 mm and inner diameter of 3 mm. The draw temperature was set to 1050° C. The composition selection was based upon the melting point for the system at 980° C.

Figure 36:
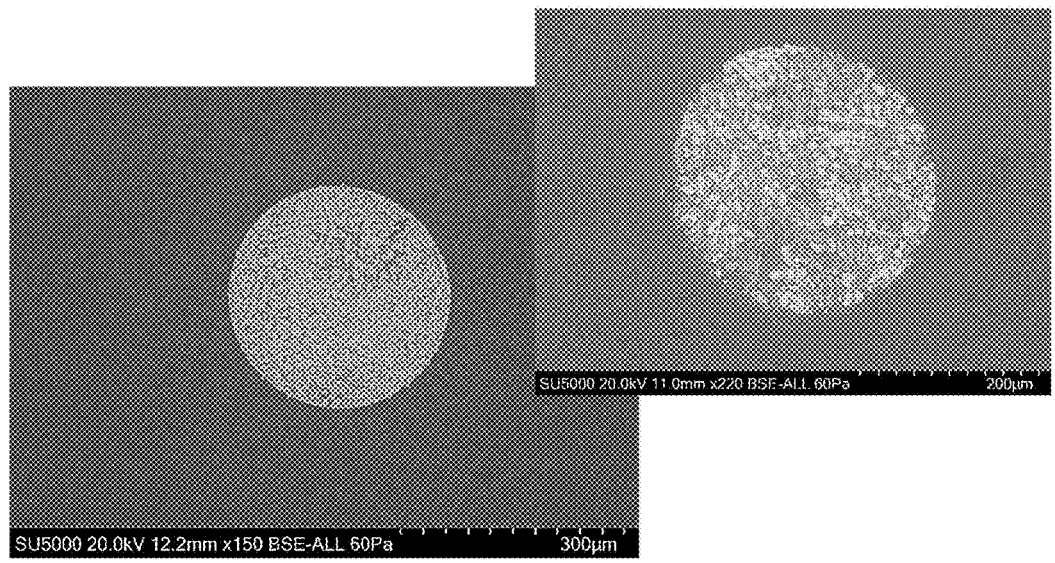
FIG. 36 illustrates a cross-section of a ZnSe:PbCl$_2$ fiber formed as described herein.
Figure 37:
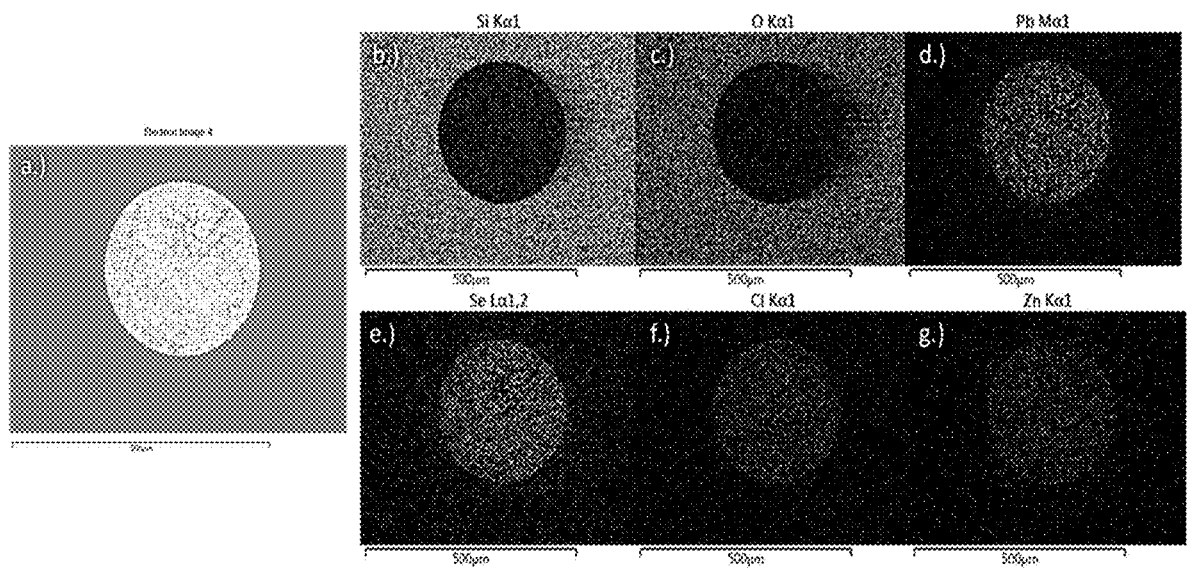
FIG. 37 provides SEM elemental analysis results of a ZnSe:PbCl$_2$ fiber formed as described herein.
Figure 38:
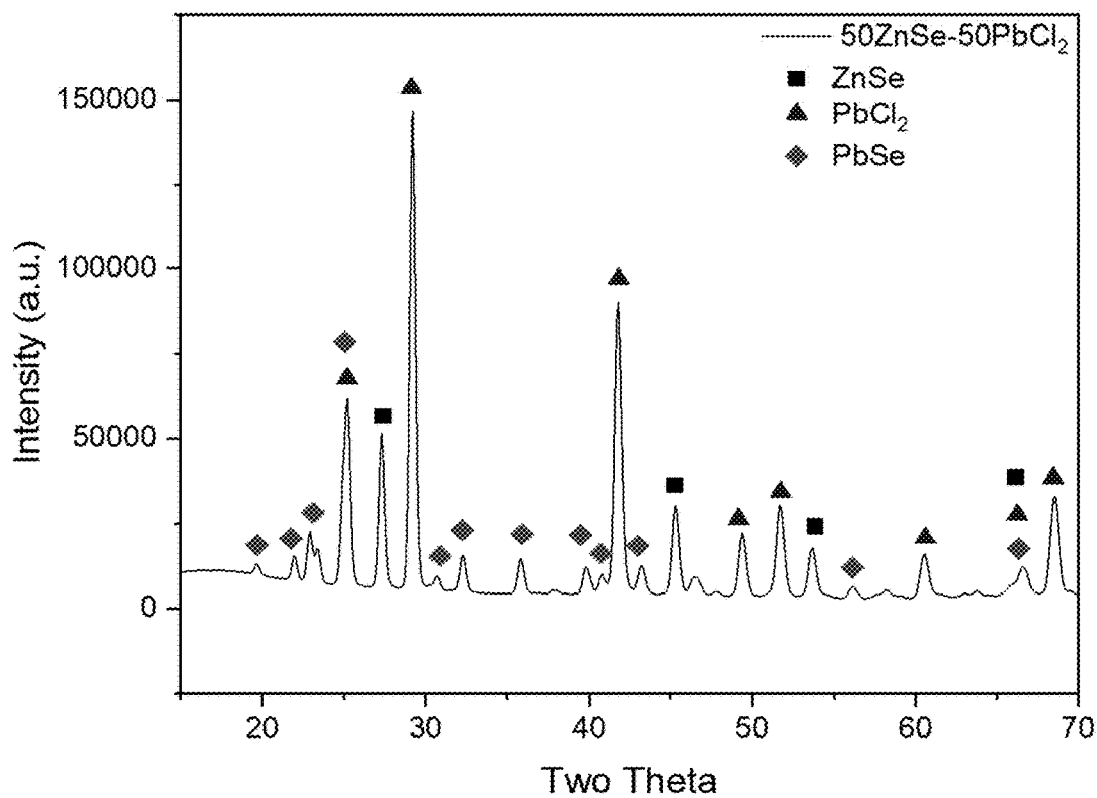
FIG. 38 provides XRD results for a ZnSe:PbCl$_2$ fiber formed as described herein.

FIG. 36 provides a cross-sectional image of a formed fiber. SEM elemental results are shown in FIG. 37, demonstrating a clear presence of ZnSe. The two phases were present but mixed fairly homogeneously throughout the core. XRD results are illustrated in FIG. 38, showing ZnSe, $PbCl_2$ and PbSe phases present in the core.

Example 9

Fibers were formed including ZnSe in the core using Sn as a flux material. The powders used were ZnSe (99.99% metals basis, Alfa Aesar) and metallic Sn (99.995% trace metals basis, Alfa Aesar). Drawn fibers were formed with a 20ZnSe:80Sn atomic ratio in the core. ZnSe:Sn does not have a published phase diagram to inventors' knowledge, and a 20:80 starting composition was chosen.

To form the fibers, the powders were thoroughly mixed in the desired concentrations using a mortar and pestle. The mixture was placed inside of a silica ampoule and sealed under vacuum. The sealed ampoule was heated to 1100° C. and held for 2 hours. The resultant core rod was then extracted and loaded into a borosilicate glass (DURAN®) preform clad with outer diameter of about 30 mm and inner diameter of 3 mm. The draw temperature was set to 1100° C.

Figure 39:
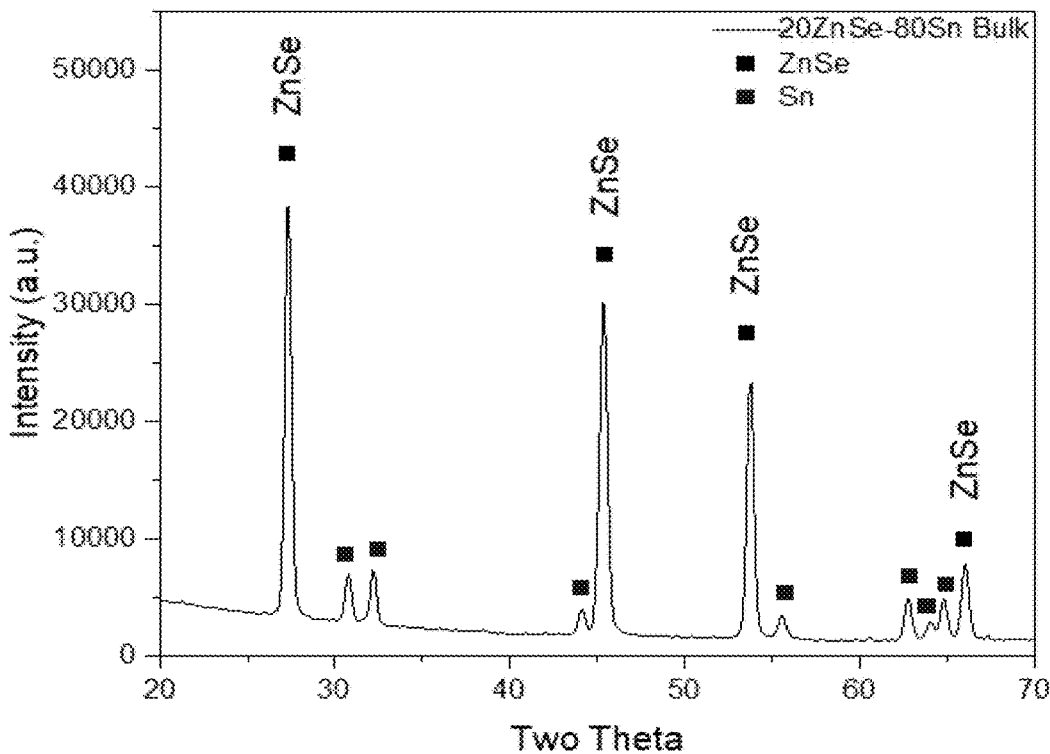
FIG. 39 provides XRD results for a ZnSe:Sn fiber formed as described herein.

XRD results are illustrated in FIG. 39, showing presence of bulk ZnSe, with expected results of ZnSe and Sn phases to be present.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a fiber comprising:
combining a first solid phase that includes a primary core material with a second solid phase acting as a flux material to form a multi-phase preform core;
thermally drawing the preform at drawing conditions to form a fiber, the preform including the multi-phase preform core within a preform glass cladding, wherein the drawing conditions include a drawing temperature that is lower than a melting temperature of the primary core material at the drawing conditions and that is at or higher than the melting temperature of the multi-phase preform core at the drawing conditions, wherein at the drawing temperature the multi-phase preform core becomes a homogeneous melt; and
cooling the thermally drawn fiber, wherein upon the cooling, the homogeneous melt solidifies to form a fiber core.

2. The method of claim 1, wherein the primary core material comprises a semiconductor material.

3. The method of claim 1, wherein the flux material comprises one or more metals in either elemental or a compound form.

4. The method of claim 1, wherein the flux material comprises one or more semiconductors in either elemental or a compound form.

5. The method of claim 1, wherein the multi-phase preform core comprises a powder or particle mixture.

6. The method of claim 1, wherein the multiphase preform core comprises a multi-phase solid.

7. The method of claim 1, wherein the fiber core that includes a third solid phase that includes the primary core material and a fourth solid phase that includes the flux material or a reaction product of the flux material.

8. The method of claim 7, further comprising thermal treatment of the fiber, such thermal treatment comprising spatially segregating the third solid phase and the fourth solid phase within the fiber core.

9. The method of claim 1, wherein the draw temperature is from about 10° C. to about 600° C. above a liquidus temperature of the multi-phase preform core at the drawing conditions.

10. The method of claim 1, wherein the draw temperature is from about 700° C. to about 1200° C.

11. The method of claim 1, wherein the drawing conditions comprise atmospheric pressure.

12. The method of claim 1, wherein the drawing conditions comprise a reducing atmosphere or an inert atmosphere.

13. The method of claim 1, further comprising performing post-formation processing of the fiber.

14. The method of claim 13, the processing comprising thermal treatment or coating the fiber.

15. A thermally drawn fiber formed in accordance with the method of claim 1.

16. The thermally drawn fiber of claim 15, wherein the primary core material comprises a crystalline primary core material which comprises one of a semiconductor material, a high vapor pressure material, or a dopant.

17. The thermally drawn fiber of claim 15, wherein the primary core material comprises a crystalline primary core material which comprises an arsenide, selenide, sulfide, phosphide, telluride, oxide, or any combination thereof.

18. The thermally drawn fiber of claim 15, wherein the primary core material comprises a crystalline primary core material which comprises gallium arsenide, indium phosphate, cadmium sulfide, cadmium selenide, cadmium oxide, zinc sulfide, zinc selenide, zinc telluride, zinc oxide, lead sulfide, lead selenide, lead telluride, indium selenide, indium (II) selenide, copper indium selenium, bismuth selenide, indium arsenide, indium gallium arsenide, silicon germanium, mercury sulfide, mercury selenium, mercury telluride, or any combination thereof.

19. The thermally drawn fiber of claim 15, wherein the flux material comprises one or more metals comprising tin, gold, copper, gallium, antimony, silicon, germanium, bismuth, silver, cadmium, lead, indium, selenium, manganese, or nickel, in elemental or compound form.

20. The thermally drawn fiber of claim 15, the glass cladding comprises a silica ($SiO_2$), a silicate, a borosilicate, a phosphate, a chalcogenide, or a germanate, wherein the clad optionally includes a dopant.

* * * * *